United States Patent
Alam et al.

(10) Patent No.: US 9,790,307 B2
(45) Date of Patent: Oct. 17, 2017

(54) PROCESS FOR THE PRODUCTION OF SILANE-CROSSLINKED POLYOLEFIN IN THE PRESENCE OF NON-TIN CATALYST AND RESULTING CROSSLINKED POLYOLEFIN

(71) Applicant: Momentive Performance Materials Inc., Waterford, NY (US)

(72) Inventors: Samim Alam, Tarrytown, NY (US); Roy U. Rojas Wahl, Teaneck, NJ (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 14/569,057

(22) Filed: Dec. 12, 2014

(65) Prior Publication Data

US 2015/0166708 A1    Jun. 18, 2015

Related U.S. Application Data

(60) Provisional application No. 61/915,638, filed on Dec. 13, 2013.

(51) Int. Cl.
| | | |
|---|---|---|
| C08F 255/02 | (2006.01) | |
| C08J 3/24 | (2006.01) | |
| C08F 230/08 | (2006.01) | |

(52) U.S. Cl.
CPC .......... *C08F 255/02* (2013.01); *C08F 230/08* (2013.01); *C08J 3/24* (2013.01)

(58) Field of Classification Search
None
See application file for complete search history.

(56) References Cited

U.S. PATENT DOCUMENTS

| | | | |
|---|---|---|---|
| 5,112,919 A | 5/1992 | Furrer et al. | |
| 6,005,055 A | 12/1999 | Dammert et al. | |
| 7,202,309 B2 | 4/2007 | Furrer et al. | |
| 7,241,840 B2 | 7/2007 | Furrer et al. | |
| 7,326,753 B2* | 2/2008 | Weller | 525/284 |
| 7,511,100 B2 | 3/2009 | Weller | |
| 7,550,547 B2* | 6/2009 | Wakabayashi et al. | 528/15 |
| 7,569,645 B2 | 8/2009 | Lin et al. | |
| 8,088,940 B2 | 1/2012 | Huang et al. | |
| 8,299,181 B2 | 10/2012 | Weller et al. | |
| 2008/0114134 A1 | 5/2008 | Pohl et al. | |
| 2008/0237537 A1 | 10/2008 | Huang et al. | |
| 2011/0259464 A1 | 10/2011 | Lacroix et al. | |
| 2011/0282024 A1* | 11/2011 | Weissenbach et al. | 528/12 |
| 2013/0022770 A1 | 1/2013 | Daiss | |

FOREIGN PATENT DOCUMENTS

| | | |
|---|---|---|
| WO | 91/09075 A1 | 6/1991 |
| WO | 95/17463 A1 | 6/1995 |
| WO | 2005/114677 A1 | 12/2005 |

OTHER PUBLICATIONS

Alam et al., "Coatings derived from novel, soybean oil-based polymers produced using carbocationic polymerization", J. Coat. Technol. Res., vol. 8(b) (2011) pp. 671-683.
International Search Report and Written Opinion dated Mar. 5, 2015.

\* cited by examiner

*Primary Examiner* — Marc Zimmer
(74) *Attorney, Agent, or Firm* — James C. Abruzzo

(57) ABSTRACT

A process for producing a silane-crosslinked polyolefin which comprises exposing a polyolefin containing at least one [1,3,2]-dioxasilinane ring structure to moisture in the presence of an organic carboxylic acid, which is used as a hydrolysis and condensation catalyst and does not contain tin, thereby producing the silane-crosslinked polyolefin, wherein the polyolefin containing at least one [1,3,2]-dioxasilinane ring structure is made by the process of grafting an olefinically unsaturated [1,3,2]-dioxasilinane to a polyolefin in the presence of a free radical initiator. There is also provided the resulting silane-crosslinked polyolefin and the graftable silane composition used in the process.

17 Claims, No Drawings

PROCESS FOR THE PRODUCTION OF SILANE-CROSSLINKED POLYOLEFIN IN THE PRESENCE OF NON-TIN CATALYST AND RESULTING CROSSLINKED POLYOLEFIN

This application claims priority to Provisional U.S. Patent Application No. 61/915,638 filed on Dec. 13, 2013, the entire contents of which are incorporated by reference herein in their entirety.

BACKGROUND OF THE INVENTION

Crosslinked polyolefins are widely used in industrial applications, especially for the production of pipes, foams, insulator for wires and cables, domestic water pipelines, offshore oil and natural gas piping, and for the transportation of chemicals, slurries, sewage and the like.

Silanes are commonly employed as crosslinkers for the production of silane crosslinked polyolefins. The silane is typically used in conjunction with a peroxide, which is used to effect grafting of the silane onto the polyethylene. The silane containing polyolefin is then crosslinked in the presence of moisture and tin-based catalyst. Often, the silanes, peroxide, anti-oxidants and catalysts are mixed to form a silane composition which is stored prior to addition to the polyolefin. The silane, peroxide, anti-oxidants and catalysts composition are at a later time added to the polyolefin under conditions which affect the grafting of the silane to the polyolefin. Because the silane, peroxide, anti-oxidant and catalysts are stored prior to use, it is desirable to have a shelf-stable silane-graftable composition.

Silane crosslinking of polyolefins can lead to many improvements in various mechanical properties of the crosslinked polyolefin. But the resulting crosslinked polyolefin still contains the presence of tin and, during the cure, generate hazardous and/or volatile organic compounds, such as methanol. If silane crosslinking agents are used where the alkoxysilyl group is derived from higher boiling monoalcohols, the curing times are often too long and impractical for the end-use application and therefore commercially not viable. Due to recent environmental concerns regarding the presence of tin compounds and the need to reduce hazardous air pollutants and volatile organic compounds during cure, it would be desirable to provide a way to crosslink polyolefins in the absence of tin and with reduced amounts of hazardous and volatile organic compounds produced during cure without compromising the resulting mechanical properties of the crosslinked polyolefin and still employing conventional equipment. It is also desirable that the silane graftable composition is shelf-stable.

BRIEF DESCRIPTION OF THE INVENTION

In accordance with the present invention, there has been unexpectedly discovered herein that the silane crosslinking agent containing at least one [1,3,2]-dioxasilinane ring structure and the use a non-tin containing hydrolysis and condensation catalyst, in particular an organic carboxylic acid can produce a crosslinked polyolefin with good mechanical properties in the absence of tin compounds and without producing hazardous or volatile organic compounds.

There is provided herein a process for producing a silane-crosslinked polyolefin which comprises exposing a polyolefin containing at least one [1,3,2]-dioxasilinane ring structure to moisture in the presence of an organic carboxylic acid used as hydrolysis and condensation catalyst which does not contain tin, thereby producing the silane-crosslinked polyolefin, wherein the polyolefin containing at least one [1,3,2]-dioxasilinane ring structure is made by the process of grafting an olefinically unsaturated [1,3,2]-dioxasilinane to a polyolefin in the presence of a free radical initiator, wherein the olefinic unsaturated [1,3,2]-dioxasilinane is given by general Formula (I):

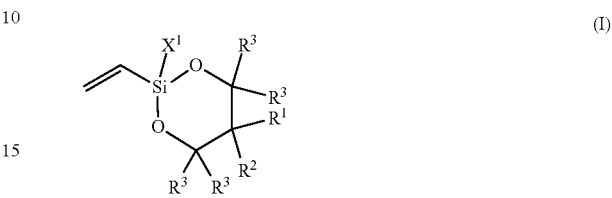

where $R^1$ is a straight chain or branched alkyl group of from 1 to 6 carbon atoms or hydrogen;

$R^2$ is a straight chain or branched alkyl group of from 1 to 6 carbon atoms, a cycloalkyl group of from 5 to 8 carbon atoms or hydrogen;

each occurrence of $R^3$ is independently a straight chain or branched alkyl group of from 1 to 6 carbon atoms or hydrogen;

$X^1$ is methyl, $-OR^6$, where $R^6$ is an alkyl group of from 1 to 8 carbon atoms,

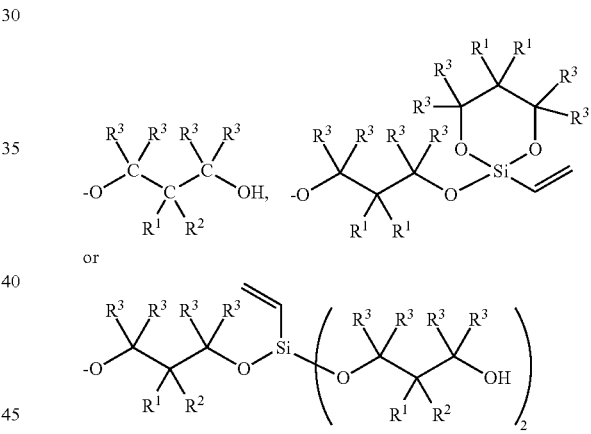

wherein $R^1$ is a straight chain or branched alkyl group of from 1 to 6 carbon atoms or hydrogen, $R^2$ is a straight chain or branched alkyl group of from 1 to 6 carbon atoms, a cycloalkyl group of from 5 to 8 carbon atoms or hydrogen, and each occurrence of $R^3$ is independently a straight chain or branched alkyl group of from 1 to 6 carbon atoms or hydrogen and the organic carboxylic acid is at least one organic carboxylic acid having general Formula (III):

$$(HO)_a G (\overset{O}{\overset{\|}{C}} OH)_b \qquad (III)$$

wherein G is a monovalent or polyvalent hydrocarbon containing up to 28 carbon atoms selected from the group consisting of alkyl, cycloalkyl, alkenyl, cycloalkenyl, aryl, aralkyl and arenyl; and the subscripts a and b are independently integers wherein a is 0 or 1 and b is 1 to 3.

The subject invention also includes the silane crosslinkable polyolefin composition comprising a polyolefin containing at least one [1,3,2]-dioxansilinane ring structure, made as described herein, and at least one organic carboxylic acid used as an hydrolysis and condensation catalyst. The subject invention also includes the crosslinked polyolefin resulting from the aforesaid crosslinking process and products fabricated therefrom.

In addition, the silane employed in the process of this invention achieves crosslinking of the polyolefin, but has the advantage of doing so without the presence of tin compounds.

Various other features, aspects and advantages of the present invention, will become more apparent with reference to the following description and appended claims.

DETAILED DESCRIPTION OF THE INVENTION

In accordance with the invention, a process is provided for producing a silane-crosslinked polyolefin, the process comprising exposing a polyolefin containing at least one [1,3,2]-dioxansilinane ring structure to moisture in the presence of an organic carboxylic acid hydrolysis and condensation catalyst thereby producing the silane-crosslinked polyolefin.

The reactions involved in the present disclosure may be considered to include the following reactions: (I)-(III):

Olefinically Unsaturated [1,3,2]-Dioxasilinane Formation

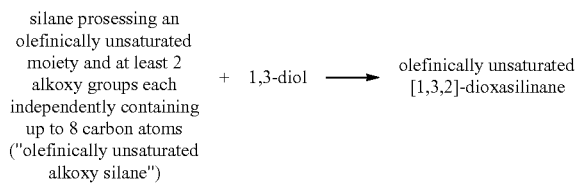

(I)

Grafting Reaction

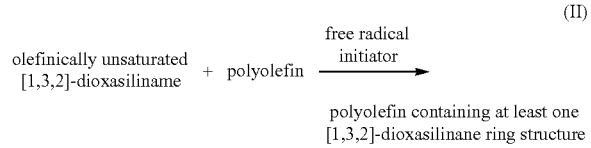

(II)

Crosslinking Reaction

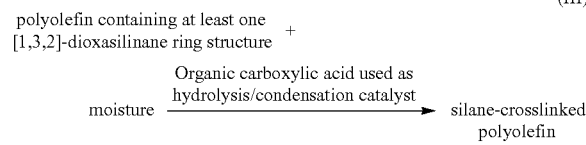

(III)

It has been unexpectedly discovered herein, that due to the presence of the cyclic moiety of the [1,3,2]-dioxasilinane ring structure grafted onto the polyolefin, the reactivity of polyolefin containing at least one [1,3,2]-dioxasilinane ring structure towards hydrolysis and condensation of the silane in the presence of organic carboxylic acids, which results in the crosslinking of polyolefin, is relatively higher than polyolefins containing alkoxysilyl groups derived from mono-alcohols, such as trimethoxysilyl, to effect crosslinking of the polyolefin. The formation of a greater percentage of the olefinically unsaturated [1,3,2]-dioxasilinane in the reaction product of the 1,3-diol with the silane containing an olefinically unsaturated moiety and three alkoxy groups (as opposed to silanes containing only hydroxyl-substituted alkoxy groups) is provided, in part, by the structure of the diol used in the preparation of the olefinically unsaturated [1,3,2]-dioxasilinane. In particular, diols which are 1,3-dihydroxyl-substituted alkanes promote the formation of the ring structure containing 6 atoms with the silyl group given by the general Formula (II).

(II)

wherein $R^1$ is an straight chain or branched alkyl group of from 1 to 6 carbon atoms or hydrogen; and $R^2$ is a straight chain or branched alkyl group of from 1 to 6 carbon atoms or a cycloalkyl group of from 5 to 8 carbon atoms; and each occurrence of $R^3$ is independently a straight chain or branched alkyl group of from 1 to 6 carbon atoms or hydrogen.

Preferably, the 1,3-diol is derived from a branched alkane in which the branching point occurs on the carbon atom which separates the two carbon atoms containing the hydroxyl groups and the carbon atoms containing the hydroxyl groups have two hydrogens bonded to them, as represented by general Formula (II) where $R^3$ is hydrogen, $R^1$ is an straight chain or branched alkyl group of from 1 to 6 carbon atoms or hydrogen, and $R^2$ is a straight chain or branched alkyl group of from 1 to 6 carbon atoms or a cycloalkyl group of from 5 to 8 carbon atoms.

The branching promotes formulation of the [1,3,2]-dioxasilinane ring structure due to steric bulk of the $R^2$ or the combination of $R^1$ and $R^2$ when $R^1$ is alkyl group of from 1 to 6 carbon atoms. The steric effects of these bulky groups promote the formation of the [1,3,2]-dioxansilinane structure, as opposed to the linear analogues which do not contain a branch in the alkylene group.

A further advantage of structures which have the branching point on the carbon atom between the carbon atoms containing the hydroxyl groups, is that the branching at this point maintains the reactivity of the [1,3,2]-dioxasilinane ring structure towards reaction with water (moisture). The reactivity towards hydrolysis provides for fast curing of the polyolefin containing at least one [1,3,2]-dioxasilinane ring structure. If the branching points occur on the carbon atoms containing the hydroxyl groups, then hydroxyl groups are bonded to a secondary carbon atom, which is sterically hindered and retards the hydrolysis rates. Longer cure times would therefore be required to provide for cure.

Representative and non-limiting examples of $R^1$ include hydrogen, methyl, ethyl, propyl, iso-propyl, butyl, isobutyl and neobutyl. Preferred $R^1$ are hydrogen and methyl. Representative and non-limiting examples of $R^2$ include methyl, ethyl, propyl, iso-propyl, butyl, isobutyl, neobutyl and cyclohexyl.

Further, the advantageous curing properties demonstrated herein are believed to be due to the amount of cyclic moiety, the [1,3,2]-dioxasilinane ring structure, formed over silanes containing only an acyclic and/or a bridging moiety, formed from the reaction of olefinically unsaturated alkoxy silane and diol as described herein. In one embodiment, it would be desirable that the reaction product of the olefinically unsaturated alkoxy silane and the 1,3-diol contain greater than 5 mole percent of the [1,3,2]-dioxasilinane ring structure, more preferably 10 to 100 mole percent, even more preferably from 45 to 100 mole percent, and still more preferably from 80 to 100 mole percent, based on the total moles of silicon in the reaction product of olefinically unsaturated alkoxy silane and 1,3-diol. The olefinically unsaturated [1,3,2]-dioxasilinane which is subsequently grafted to the polyolefin to form the polyolefin contains at least one [1,3,2]-dioxasilinane, and is then used to form a silane-crosslinked polyolefin as described herein.

It has also been unexpectedly discovered herein that the presence of substitution, and the type of substitution, on the cyclic moiety of the olefinically unsaturated [1,3,2]-dioxasilinane employed herein (as determined by the use of a branched diol) is more conducive towards an increased rate of hydrolysis and condensation of the polyolefin containing at least one [1,3,2]-dioxasilinane ring structure described herein, as opposed to the acyclic analogues or small or larger ring structures containing silicon, oxygen and carbon atoms.

Furthermore, the specific weight amounts of the reaction product of the olefinically unsaturated alkoxysilane with 1,3-diol comprising olefinically unsaturated [1,3,2]-dioxasilinane used in the grafting reaction to prepare of the polyolefin containing at least one [1,3,2]-dioxasilinane provides for an improved modulus and other mechanical properties. If too low of an amount of the reaction product of the olefinically unsaturated alkoxysilane with 1,3-diol is used in the grafting reaction, the polyolefin composition will have insufficient grafted [1,3,2]-dioxasilinane to form a continuous network formed by the condensation of the silanes, and not achieve a crosslinked network. If too high of an amount of the reaction product of the olefinically unsaturated alkoxysilane with 1,3-diol is used in the grafting reaction, the polyolefin composition will have too many crosslinking points which are too closely spaced, resulting in a network which is brittle.

Further even still, an organic carboxylic acid, which is used as a hydrolysis and condensation catalyst, promotes the hydrolysis and condensation of the grafted [1,3,2]-dioxasilinane group on the polyolefin. Organic carboxylic acids useful in the present invention have the general Formula (III):

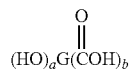

(III)

wherein G is a monovalent or polyvalent hydrocarbon containing up to 28 carbon atoms selected from the group consisting of alkyl, cycloalkyl, alkenyl, cycloalkenyl, aryl, aralkyl and arenyl; and the subscripts a and b are independently integers wherein a is 0 or 1 and b is 1 to 3.

As used herein, alkyl includes straight and branched alkyl groups; alkenyl includes any straight or branched alkenyl group containing one or more carbon-carbon double bonds, where the point of substitution can be either at a carbon-carbon double bond or elsewhere in the group. Specific examples of alkyls include methyl, ethyl, propyl, isobutyl. Specific examples of alkenyls (olefinically unsaturated moieties) include vinyl, propenyl, allyl and methallyl.

As used herein, aryl includes any aromatic hydrocarbon from which one hydrogen atom has been removed; aralkyl includes any of the aforementioned alkyl groups in which one or more hydrogen atoms have been substituted by the same number of like and/or different aryl (as defined herein) substituents; and arenyl includes any of the aforementioned aryl groups in which one or more hydrogen atoms have been substituted by the same number of like and/or different alkyl (as defined herein) substituents. Specific examples of aryls include phenyl and naphthalenyl. Specific examples of aralkyls include benzyl and phenethyl. Specific examples of arenyls include tolyl and xylyl.

As used herein, cycloalkyl and cycloalkenyl refers to hydrocarbons containing a cyclic structure, which include bicyclic, tricyclic, and higher cyclic structures, as well as the aforementioned cyclic structures further substituted with alkyl and/or alkenyl groups. Representative examples include, but are not limited to, norbornyl, norbornenyl, ethylnorbornyl, ethylnorbornenyl, cyclopentyl, cyclohexyl, ethylcyclohexyl, cyclohexenyl, ethylcyclohexenyl, cyclohexylcyclohexyl, and cyclododecatrienyl.

The term "lower alkyl" is meant to include a carbon chain having from 1 to 6 carbon atoms. The term "lower alkene" is meant to include a carbon chain having from 2 to 6 carbon atoms In one embodiment herein the polyolefin containing at least one [1,3,2]-dioxasilinane is made by the process of grafting an olefinically unsaturated [1,3,2]-dioxasilinane to a polyolefin under anhydrous conditions, optionally in the presence of a free radical initiator. It will be understood herein that anhydrous conditions can comprises the complete absence of moisture or merely the presence of atmospheric moisture at levels less than about 200 parts per million water, more preferably less than about 100 parts per million water, and even more preferably less than about 15 parts per million water, based upon the weight of the polyolefin.

In one embodiment, the polyolefin is at least one member selected from the group consisting of homopolymers, copolymers, terpolymers, and tetrapolymers of ethylene, propylene, butene, pentene, hexene, heptene, octene, nonene, decene, dienes, cyclic dienes and aromatic dienes.

Specifically, the polyolefin to be grafted onto and subsequently crosslinked can be a homopolymer such as polyethylene, polypropylene, polybutadiene, polyvinyl chloride, polyvinylidene chloride, and the like.

According to another embodiment, the polyolefin is at least one polymer selected from the group consisting of (i) ethylene copolymerized with one or more other ethylenically unsaturated monomer such as alpha-olefin of 3 to 10 carbon atoms, ethylenically unsaturated carboxylic acid, ethylenically unsaturated carboxylic acid ester and ethenically unsaturated dicarboxylic acid anhydride, (ii) olefin-based rubber such as ethylene propylene (EP) rubber, ethylene-propylene-diene monomer (EPDM) rubber and styrene butadiene rubber (SBR) and (iii) ionomer resin. Ethylene copolymerized with one or more other alpha-olefins of 3 to 10 carbon atoms include low density polyethylene, linear low density polyethylene, and ultra linear low density polyethylene.

Copolymerizable unsaturated carboxylic acids and anhydrides thereof include acrylic acid, methacrylic acid, butenoic acid, maleic acid, maleic anhydride, and the like.

Copolymerizable ethylenically unsaturated carboxylic acid esters include vinyl acetate, vinyl acrylate, methyl acrylate, ethyl acrylate, butyl acrylate, and methyl methacrylate.

Specific copolymers include those of ethylene-propylene, ethylene-butene, ethylene-hexene, ethylene-octene, ethylene-vinylacetate, ethylene-methylacrylate, ethylene-ethylacrylate, ethylene-butylacrylate, and styrene-butadiene.

According to another embodiment, the polyolefins can be a blend of two or more such polyolefins. Thus, e.g., a polyethylene can be blended with any polymer compatible therewith such as polypropylene, polybutadiene, polyisoprene, polychloroprene, chlorinated polyethylene, polyvinyl chloride, a styrene/butadiene copolymer, a vinyl acetate/ethylene co-polymer, an acrylonitrile/butadiene copolymer, and a vinyl chloride/vinyl acetate copolymer.

According to another embodiment, the polyolefin can be a polymer blend including at least one polyolefin elastomer component and at least one crystalline component. The polyolefin elastomer component of the blend can be a copolymer of ethylene and alpha-olefin or a terpolymer of ethylene, an alpha-olefin and a diene. If the blend is a copolymer of ethylene and alpha-olefin, then preferably the copolymers used comprise from about 35 to about 95 weight percent ethylene, and from about 5 to about 65 weight percent of at least one alpha-olefin comonomer, based on the total weight of the monomers. According to another embodiment, the copolymers comprise from about 25 to about 65 weight percent of at least one alpha-olefin comonomer, based on the total weight of the monomers. The comonomer content is measured using infrared spectroscopy according to ASTM D-2238 Method B. Typically, the substantially linear ethylene polymers are copolymers of ethylene and an alpha-olefin of 3 to 20 carbon atoms, as for example, propylene, 1-butene, 1-hexene, 4-methyl-1-pentene, 1-heptene, 1-octene, styrene, etc., and according to another embodiment of 3 to 10 carbon atoms, and according to yet another embodiment a copolymer of ethylene and 1-octene.

The ethylene/alpha-olefin copolymers can be either heterogeneously branched or homogeneously branched. These heterogeneously branched copolymers, i.e. polyethylenes, fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. According to an embodiment of the present invention, the elastomer component is LDPE having a density of less than about 0.885 gram per cubic centimeter.

Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 gram per cubic centimeter (g/cc), is typically a homopolymer of ethylene, and it contains relatively few branch chains relative to the various linear copolymers of ethylene and an alpha-olefin. HDPE is well known, commercially available in various grades.

Linear copolymers of ethylene and at least one alpha-olefin of 3 to 12 carbon atoms, preferably of 4 to 8 carbon atoms, are also well known, commercially available and useful in this invention. As is well known in the art, the density of a linear ethylene/alpha-olefin copolymer is a function of both the length of the alpha-olefin and the amount of such monomer in the copolymer relative to the amount of ethylene, the greater the length of the alpha-olefin and the greater the amount of alpha-olefin present, the lower the density of the copolymer. Linear low density polyethylene (LLDPE) is typically a copolymer of ethylene and an alpha-olefin of 3 to 12 carbon atoms, or 4 to 8 carbon atoms, as for example, 1-butene, 1-hexene, 1-octene, etc., that has sufficient alpha-olefin content to reduce the density of the copolymer to that of LDPE. When the copolymer contains even more alpha-olefin, the density will drop below about 0.91 gram per cubic centimeter and these copolymers are known as ultra low density polyethylene (ULDPE) or very low density polyethylene (VLDPE). The densities of these linear polymers generally range from about 0.87 to about 0.91 gram per cubic centimeter.

The polyolefin component of the blends that can be used include terpolymers, e.g. ethylene/propylene/diene monomer (EPDM), tetrapolymers, and the like. The diene monomer components of these elastomers include both conjugated and nonconjugated dienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like. According to another embodiment, nonconjugated diene is 5-ethylidene-2-norbornene.

Examples of conjugated dienes include butadiene, isoprene, 2,3-dimethylbutadiene-1,3,1,2-dimethylbutadiene-1, 3,1,4-dimethylbutadiene-1,3,1-ethylbutadiene-1,3,2-phenylbutadiene-1,3, hexadiene-1,3,4-methylpentadiene-1,3,1, 3-pentadiene ($CH_3CH\!=\!CH\!-\!CH\!=\!CH_2$; commonly called piperylene), 3-methyl-1,3-pentadiene, 2,4-dimethyl-1,3-pentadiene, 3-ethyl-1,3-pentadiene, and the like. According to another embodiment, the conjugated diene is a 1,3-pentadiene.

Exemplary terpolymers include ethylene/propylene/5-ethylidene-2-norbornene, ethylene/1-octene/5-ethylidene-2-norbornene, ethylene/propylene/1,3-pentadiene, and ethylene/1-octene/1,3-pentadiene. Exemplary tetrapolymers include ethylene/propylene/mixed dienes, e.g. ethylene/propylene/5-ethylidene-2-norbornene/piperylene.

The crystalline polyolefin polymer component of the blend has a percent crystallinity of at least about 40%, preferably at least about 50% and more preferably at least about 60%, preferably in combination with a melting point of greater than about 100° C., more preferably greater than about 120° C. The percent crystallinity is determined by dividing the heat of fusion as determined by DSC of a polymer sample by the total heat of fusion for that polymer sample. Preferred crystalline polyolefins include high density polyethylene (as described above), and polypropylene. The total heat of fusion for high density homopolymer (i.e. 100% crystalline) polyethylene is about 292 joule per gram (J/g), and the total heat of fusion for 100% crystalline polypropylene is about 209 joule per gram.

If the crystalline polyolefin component of the blend of this invention is polypropylene, then it can be either a homopolymer or one or more copolymers of propylene and up to about 20 mole percent ethylene or at least one alpha-olefin having up to about 12 carbon atoms. If a copolymer, then it can be random, block or graft, and it can be either isotactic or syndiotactic.

The blend composition can vary widely, but typically the polyolefin elastomer:crystalline polymer weight ratio is at least about 70:30. According to another embodiment, the polyolefin elastomer:crystalline polymer weight ratio is at least about 80:20. According to yet another embodiment, the polyolefin elastomer:crystalline polymer weight ratio is at least about 85:15. The polyolefin elastomer:crystalline polymer weight ratio typically does not exceed about 99:1.

In one embodiment herein the polyolefin component herein can be a combination of any of the polyolefins and/or polymers described herein.

The olefinically unsaturated [1,3,2]-dioxasilinane which is used in the process of grafting to the polyolefin as described herein is such that it contains a cyclic moiety and has the general Formula (I):

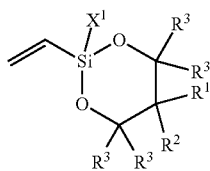
(I)

where $R^1$ is a straight chain or branched alkyl group of from 1 to 6 carbon atoms or hydrogen;

$R^2$ is a straight chain or branched alkyl group of from 1 to 6 carbon atoms, a cycloalkyl group of from 5 to 8 carbon atoms or hydrogen;

each occurrence of $R^3$ is independently a straight chain or branched alkyl group of from 1 to 6 carbon atoms or hydrogen;

$X^1$ is methyl, —$OR^6$, where $R^6$ is an alkyl group of from 1 to 8 carbon atoms,

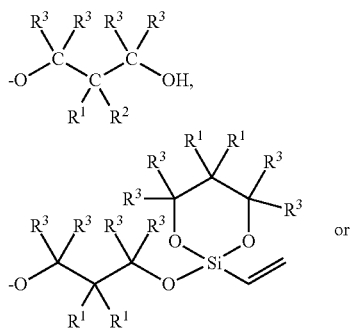

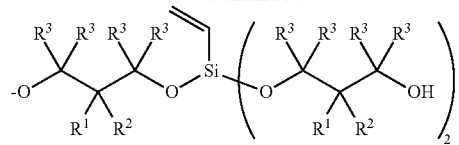

wherein $R^1$ is a straight chain or branched alkyl group of from 1 to 6 carbon atoms or hydrogen, $R^2$ is a straight chain or branched alkyl group of from 1 to 6 carbon atoms, a cycloalkyl group of from 5 to 8 carbon atoms or hydrogen, and each occurrence of $R^3$ is independently a straight chain or branched alkyl group of from 1 to 6 carbon atoms or hydrogen.

In one embodiment, $R^1$ and $R^2$ are each independently selected from the group consisting of hydrogen, methyl and ethyl and $R^3$ is hydrogen.

In another embodiment, $X^1$ is methyl, methoxy, ethoxy or

group, where $R^1$ is hydrogen, methyl or ethyl and $R^2$ is methyl, ethyl, propyl or isopropyl.

In yet another embodiment, the olefinically unsaturated [1,3,2]-dioxasilinane which is used in the process of grafting to the polyolefin as described herein is such that it contains a cyclic moiety and has the general Formula (IV):

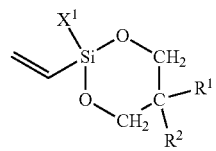
(IV)

wherein $R^1$ is a straight chain or branched alkyl group of from 1 to 6 carbon atoms or hydrogen;

$R^2$ is a straight chain or branched alkyl group of from 1 to 6 carbon atoms or a cycloalkyl group of from 5 to 8 carbon atoms;

$X^1$ is methyl, —$OR^6$, where $R^6$ is an alkyl group of from 1 to 8 carbon atoms, or

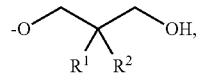

wherein $R^1$ is a straight chain or branched alkyl group of from 1 to 6 carbon atoms or hydrogen and $R^2$ is a straight chain or branched alkyl group of from 1 to 6 carbon atoms or a cycloalkyl group of from 5 to 8 carbon atoms.

It will be understood herein, that in addition to the aforementioned olefinically unsaturated [1,3,2]-dioxasilinane may also contain a bridging moiety, in which the two different olefinically unsaturated [1,3,2]-dioxasilinane are bonded together through a bridging moiety

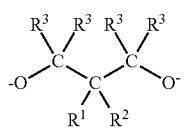

wherein $R^1$ is a straight chain or branched alkyl group of from 1 to 6 carbon atoms or hydrogen, $R^2$ is a straight chain or branched alkyl group of from 1 to 6 carbon atoms, a cycloalkyl group of from 5 to 8 carbon atoms or hydrogen, and each occurrence of $R^3$ is independently a straight chain or branched alkyl group of from 1 to 6 carbon atoms or hydrogen, preferably hydrogen, and the open valences are bonded to the silicon atoms in place of the $X^1$ groups.

It is further understood, that the olefinically unsaturated [1,3,2]-dioxasilinane may be part of a composition resulting from the reaction product of the olefinically unsaturated silane having at least two alkoxy groups and 1,3-diol, where the composition also contain acyclic analogues or byproducts of the reaction.

The amount of olefinically unsaturated [1,3,2]-dioxasilinane composition which contains the olefinically unsaturated [1,3,2]-dioxasilinane and the byproducts and reactants of its formation reaction, that is reacted with the polyolefin depends in part upon the reaction conditions and the degree of modification desired in the polyolefin. The amounts of olefinically unsaturated [1,3,2]-dioxasilinane composition may vary from about 0.1 to about 30 percent by weight, based on the weight of the polyolefin. According to another embodiment, the amount of the olefinically unsaturated [1,3,2]-dioxasilinane composition is from about 0.5 to about 10 percent by weight, based on the weight of the polyolefin. According to yet another embodiment, the amount of the olefinically unsaturated [1,3,2]-dioxasilinane composition is from about 1.0 to about 2.5 percent by weight, based on the weight of the polyolefin.

In one embodiment, the olefinically unsaturated [1,3,2]-dioxasilinane composition contains greater than about 5 mole percent olefinically unsaturated [1,3,2]-dioxasilinane, preferably greater than about 25 mole percent, more preferably greater than about 50 mole percent olefinically unsaturated [1,3,2]-dioxasilinane, and most preferably greater than about 95 mole percent olefinically unsaturated [1,3,2]-dioxasilinane, based on the moles of silicon atom present in the olefinically unsaturated [1,3,2]-dioxasilinane composition. The mole percent of the olefinically unsaturated [1,3,2]-dioxasilinane in the composition is determined by $^{29}$Si NMR spectroscopic method.

The free radical initiators that can be employed in the present invention are those that decompose upon heating and generate free radicals. The free radical initiators can be organic peroxides, organic peresters, azo compounds and combinations thereof.

In one embodiment herein, the term organic peroxide is meant to include benzoyl peroxide, dichlorobenzoyl peroxide, dipropionyl peroxide, t-butyl peroxyisobutyrate or lauroyl peroxide dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 1,3-bis(t-butyl-peroxyisopropyl)benzene and combinations thereof. In one embodiment, organic peresters include compounds such as t-butyl peracetate, t-butyl peroxy-2-ethyl hexanoate, t-butyl peroxy isobutyrate, t-butyl peroxy benzoate, 2,5-di(peroxybenzoate)hexyl-3, di-t-butyldiperoxy phthalate, 2,5-dimethyl-2,5-di(benzoyl peroxy)hexane, t-butylperoxy maleate, t-butylperoxy isopropyl carbonate and combinations thereof. Azo compounds can include compounds such as azobisisobutyronitrile, azoisobutylvaleronitrile, dimethyl azodiisobutyrate and combinations thereof. Further organic peroxides can include ketone peroxides such as methyl ethyl ketone peroxide, cyclohexanone peroxide, 1,1-bis(t-butylperoxy)-3,5,5-trimethylcyclohexane and combinations thereof. Still further organic peroxides can include hydroperoxides such as t-butyl hydroperoxide, cumene hydroperoxide, diisopropylbenzene hydroperoxide, para-menthane hydroperoxide, 2,5-dimethylhexane-2,5-dihydroperoxide and combinations thereof. Even still further, organic peroxides can include dialkyl peroxides such as di-t-butyl peroxide. In one embodiment, the free radical initiator is dicumyl peroxide, 2,5-dimethylhexane-2,5-dihydroperoxide, and 2,5-dimethyl-2,5-di(t-butylperoxy)hexane, molecular oxygen and combinations thereof.

The free radical initiators described above can be used either alone or as a mixture of two or more. According to another embodiment, the free radical initiator is an organic peroxide such as benzoyl peroxide, dichlorobenzoyl peroxide, dicumyl peroxide, alpha-bis(tert-butylperoxy)di-isopropylbenzene or di-tertiary butyl peroxide. According to an embodiment of the present invention, the free radical initiator is dicumyl peroxide. The criteria for choosing an appropriate free radical initiator are known to persons skilled in the art and will not be repeated here.

The amount of the free radical initiator can be varied over wide ranges, for example, from about 0.01 weight percent to about 0.4 weight percent, and all ranges therebetween, based on the weight of the polyolefin. According to another embodiment, the amount of the free radical initiator is from about 0.02 to about 0.2 weight percent, based on the weight of the polyolefin. According to yet another embodiment, the amount of the free radical initiator is about 0.02 to about 0.1 weight percent, based on the weight of the polyolefin.

The grafting of the olefinically unsaturated [1,3,2]-dioxasilinane to polyolefin, (the grafting reaction) optionally in the presence of a free-radical initiator herein can be conducted by those skilled in the art using known methods and using known reaction temperatures and times.

In one embodiment, the olefinically unsaturated [1,3,2]-dioxasilinane composition is mixed with the polyolefin and free radical initiator and optionally other ingredients in a mixer that temperature ranging from about 140° C. to about 260° C., more specifically from about 60° C. to 250° C. and most specifically about 180° C. to about 240° C.; and said period of time is specifically of from about 0.5 to about 30 minutes, more specifically of from 1 to 10 minutes and most specifically of from about 2 to about 5 minutes. Any of a larger variety of mixers can be used, such as intermeshing mixer, mixers having two counter-rotating rotors and extruders.

In one embodiment, the specific method is to blend the polyolefin with the olefinically unsaturated [1,3,2]-dioxasilinane and free radical initiator in the first stage of a reactor extruder, such as a single screw extruder, specifically one with a length/diameter (L/D) ratio of specifically of about 25:1 or greater, more specifically of 30:1 or greater and most specifically of 38:1 or greater. The grafting conditions can vary greatly depending on the compound formulation, but the melt temperatures are specifically from about 130° C. to about 260° C., more specifically from about 210° C. and about 230° C., and most specifically from about 200° C. to about 220° C. depending upon the residence time and the half-life of the free radical initiator, such as the peroxides.

The organic carboxylic acid, a non-tin hydrolysis and condensation catalyst, which is used herein in the crosslinking reaction of the polyolefin containing at least one [1.3.2]-dioxasilinane ring structure in the presence of moisture (the crosslinking reaction) is at least one having the general Formula (III):

wherein G is a monovalent or polyvalent hydrocarbon containing up to 28 carbon atoms selected from the group consisting of alkyl, cycloalkyl, alkenyl, cycloalkenyl, aryl, aralkyl and arenyl; and the subscripts a and b are independently integers wherein a is 0 or 1 and b is 1 to 3.

Specifically, the organic carboxylic acid is selected from the group consisting of at least one aliphatic carboxylic acid, hydroxyl-substituted aliphatic carboxylic acids, dicarboxylic acid, tricarboxylic acid and combinations thereof, such that there could be any of one or more aliphatic carboxylic acids, one or more hydroxyl-substituted carboxylic acids, one or more aromatic acids, one or more dicarboxylic acids and, a combination of one or more aliphatic carboxylic acids, hydroxyl-substituted aliphatic carboxylic acids, one or more aromatic acids or one or more dicarboxylic acids. In one embodiment the aliphatic carboxylic acid is hydroxyl substituted aliphatic acid is one that contains up to 28 carbon atoms, more specifically from 8 to 18 carbon atoms.

Some non-limiting examples of suitable organic carboxylic acids and dicaboxylic acids that may be employed herein are selected from the group consisting of neodecanoic acid, lauric acid, capric acid, myristic acid, palmitic acid, oleic acid, stearic acid, behenic acid, arachidic acid, 12-hydroxystearic acid, ricinolic acid, montanic acid, oxalic acid, malonic acid, succinic acid, glutaric acid, adipic acid, pimelic acid, suberic acid, azelic acid, sebacic acid, phthalic acid and combinations thereof.

In one embodiment, the non-tin hydrolysis and condensation catalyst is a long chain linear or branched aliphatic carboxylic acid having from 8 to 18 carbon atoms, which provides uniform dispersion during mixing with polyolefin containing at least one [1,3,2]-dioxasilinane and thus, better catalytic activity. Additionally non-tin containing shorter chain diacids, such as the non-limiting examples of succinic acid and adipatic acid, may also be used herein as non-tin hydrolysis and condensation catalyst to provide a similar level of improved catalytic activity without the use of tin compounds.

The organic carboxylic acids are often mixed with the silane containing at least one [1,3,2]-dioxasilinane and optionally other ingredients, such as the anti-oxidant, free radical initiators and/or carriers, and stored long periods of time, such as from about 1 day to about 4 years and more specifically about 1 month to about 2 years. The mixture of the silane containing at least one [1,3,2]-dioxasilinane and optionally other ingredients therefore needs to be shelf-stable. Poor shelf-life may result from the mixture of an organic carboxylic acid in the present of a hydroxyl-containing compound and silane containing at least one [1,3,2]-dioxasilinane, because organic carboxylic acids may react with other components of the mixture. For example, the organic carboxylic acid may esterify with a hydroxyl-containing compound with the generation of water. The water subsequently reacts with the silane containing least one [1,3,2]-dioxasilinane to form a silanol, which further condenses to form siloxanes of the silane containing least one [1,3,2]-dioxasilinane. The silane containing least one [1,3,2]-dioxasilinane is a dehydrating agent, consuming the water that is formed during the esterification reaction, thereby driving the esterification reaction. The organic carboxylic acid may also react directly with the silane containing least one [1,3,2]-dioxasilinane to form a —Si—O—C(=O)— group and a hydroxyl-containing compound. The hydroxyl-containing compound can then react with the carbonyl of the —Si—O—C(=O)— group to form a silanol and ester. The silanol condenses to form siloxanes and water.

In one embodiment, the shelf-stability of composition containing the silane containing least one [1,3,2]-dioxasilinane, the organic carboxylic acid and optionally other components is determined using an Infrared (IR) spectroscopic method. The method involve obtaining an Infrared spectrum of composition containing the silane containing least one [1,3,2]-dioxasilinane, the organic carboxylic acid and optionally other components one hour after preparation where the spectrum is in Absorbance units. The deconvoluted area of the carbonyl stretching frequency assigned to the carbonyl group of the acid in the 1785 to 1710 $cm^{-1}$ region is determined, referred to as $A_o$. A second spectrum of the silane containing least one [1,3,2]-dioxasilinane, the organic carboxylic acid and optionally other components it taken after storage for some period of time, referred to as time t. The deconvoluted area of the carbonyl stretching frequency assigned to the carbonyl group of the acid in the 1785 to 1710 $cm^{-1}$ region is determined, and referred to as $A_t$. The percent of reacted organic carboxylic acid compound is determined using the equation:

$$\text{Percent reacted organic carboxylic acid} = [(A_o - A_t)/A_o] \times 100\%.$$

The deconvolution of the absorbance peaks can be done by curve fitting the absorbance peak to a Gaussian function and then measure the area of the curve fitted Gaussian function from the baseline of the spectrum to the top of the absorbance peak.

A mixture of silane containing least one [1,3,2]-dioxasilinane, the organic carboxylic acid and optionally other components is shelf-stable if the percent of unreacted organic carboxylic acid, determined by subtracting the percent reacted organic acid from 100%, is from about 80 to about 100 percent after about 1 month of storage, more preferably from about 80 to about 100 percent after about 1 year of storage and even more specifically from about 90 to about 100 percent after about 1 year of storage.

In one embodiment, organic carboxylic acid having improved storage stability in the presence of the silane containing least one [1,3,2]-dioxasilinane and optionally other components has the structure where the alpha-carbon to the carboxylic acid group contains three alkyl groups. The three alkyl groups on the alpha carbon atom provide for steric hindrance that inhibits the reaction with both the hydroxyl-containing compounds and the silane containing least one [1,3,2]-dioxasilinane. Specifically, the organic carboxylic acid with improve stability to reaction with the hydroxyl-containing compound and the silane containing least one [1,3,2]-dioxasilinane has the general Formula (III):

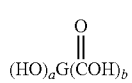

wherein G is a monovalent hydrocarbon group having from 6 to 18 carbon atoms and having the Formula (V):

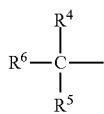

(V)

wherein each $R^4$, $R^5$ and $R^6$ is independently an alkyl group having from 1 to 15 carbon atoms with the proviso that the sum of carbon atoms in $R^4$, $R^5$ and $R^6$ groups is from 5 to 17 carbon atoms, a is 0 and b is 1. Representative and non-limiting organic carboxylic acids having improve stability with the silane containing least one [1,3,2]-dioxasilinane include 2,2-dimethylhexanoic acid, 2-ethyl-2,5-dimethylhexanoic acid, 2,2-dimethyloctanoic acid, and 2-ethyl-2,11-dimethyldodecanoic acid.

The organic carboxylic acid used as tin-free hydrolysis and condensation catalyst will typically be present, in a first embodiment, in an amount of from about 0.0003 to about 5.0 weight percent, in a second embodiment from about 0.05 to about 1.0 weight percent, in a third embodiment from about 0.1 to about 0.5 weight percent, based upon the weight of the polyolefin.

In one embodiment herein, the organic carboxylic acid may be present in the reaction mixture of the previous grafting reaction, along with the optional free radical initiator, in which the organic carboxylic acid may or may not be involved as a catalyst in the grafting reaction step, but may be merely present for subsequent use as a non-tin hydrolysis and condensation catalyst when the polyolefin containing at least one [1,3,2]-dioxasilinane ring structure is crosslinked by exposure to moisture in the crosslinking reaction.

Alternatively, the organic carboxylic acid may be added to the polyolefin containing at least one [1,3,2]-dioxasilinane prior to and/or during the exposure to moisture step. The completion of the exposure to moisture step can be contemplated by those skilled in the art depending on the desired degree of polyolefin crosslinking, depending on the process limitations and/or the desired article or product intended to be manufactured from the crosslinked polymer, as will be understood by those skilled in the art.

In one example, such moisture can comprise more moisture than atmospheric moisture, such as added water to the reaction mixture resulting from the grafting reaction or immersion of the polyolefin containing at least one [1,3,2]-dioxasilinane in water for a period of time suitable to effect crosslinking, or a period of time to effect initiation of crosslinking of the polyolefin containing at least one [1,3,2]-dioxasilinane, for example from about 30 seconds to about 100 hours, more specifically from about 30 seconds to about 6 hours, most specifically from about 30 seconds to about 4 hours and at room temperature or elevated temperatures up to about 100° C., or placing the polyolefin containing at least one [1,3,2]-dioxasilinane into a sauna where the moisture is in the form of steam.

In one non-limiting embodiment herein, the olefinically unsaturated [1,3,2]-dioxasilinane of reaction (I) is made by the process of reacting a silane possessing an olefinically unsaturated moiety and at least two alkoxy groups, each alkoxy group independently containing up to about 8 carbon atoms, (olefinically unsaturated alkoxy silane) with diol.

In one embodiment, the olefinically unsaturated silane containing at least two alkoxy groups is selected from the group consisting of a vinyltrimethoxysilane, vinyltriethoxysilane, vinyltri-isopropoxysilane, vinyltributoxysilane, vinylmethyldimethoxysilane and vinylmethyldiethoxysilane.

In another embodiment, the olefinically unsaturated alkoxy silane is such that the at least two alkoxy groups are independently selected from the group consisting of methoxy, ethoxy, propoxy and isopropoxy. In one more specific embodiment, the olefinically unsaturated alkoxy silane is an olefinically unsaturated trialkoxy silane, where the alkoxy group is methoxy or ethoxy.

In one embodiment, the 1,3-diol used herein has the general Formula (II):

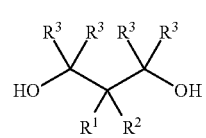

(II)

wherein $R^1$ is an straight chain or branched alkyl group of from 1 to 6 carbon atoms or hydrogen; and $R^2$ is a straight chain or branched alkyl group of from 1 to 6 carbon atoms or a cycloalkyl group of from 5 to 8 carbon atoms; and each occurrence of $R^3$ is independently a straight chain or branched alkyl group of from 1 to 6 carbon atoms or hydrogen.

The structure given for 1,3-diol above will herein be referred to as the 1,3-diol, prefixed by the particular hydrocarbon or group associated with the two OH groups. Some non-limiting examples of 1,3-diols include those selected from the group consisting of neopentyl glycol, 1,3-propanediol, 2-methyl-1,3-propanediol, 2-ethyl-1,3-propanediol, 2,2-diethyl-1,3-propanediol, 2-hexyl-1,3-propanediol and combinations thereof. More specifically, 1,3-diols having a branching point on the carbon atom between the two carbon atoms containing a hydroxyl group are more suitable in producing olefinically unsaturated [1,3,2]-dioxasilinane. Such branched 1,3-diols include neopentyl glycol, 2-methyl-1,3-propanediol, and combinations thereof.

As stated above, it has been unexpectedly discovered herein that in Reaction (I) when the molar ratio of 1,3-diol per alkoxy-silyl group of the olefinically unsaturated silane having at least two alkoxy groups which can be esterified is from about 0.5 to about 3, more specifically from about 1 to about 2, that a cyclic moiety with the noted advantages can be produced on the silane to form the [1,3,2]-dioxasilinane ring structure employed for grafting and subsequent crosslinking of said grafted olefinically unsaturated [1,3,2]-dioxasilinane composition as is described herein.

In one embodiment, the bridging moiety content of the olefinically unsaturated [1,3,2]-dioxasilinane composition used herein must be kept sufficiently low to prevent excessive average molecular weights and crosslinking, which would lead to gelation of the compositions herein. In one embodiment there is less than about 50 weight percent of silanes containing a bridging moiety, more specifically less than about 30 weight percent of bridging moieties, based on the total weight of olefinically unsaturated [1,3,2]-dioxasilianane composition produced in reaction product of reaction (I) as described herein.

Representative examples of the olefinically unsaturated [1,3,2]-dioxasilinane described in the present invention include 2-methyl-3-(5-methyl-2-vinyl-[1,3,2]dioxasilinan- 2-yloxy)-propan-1-ol, 2-methyl-2-vinyl-[1,3,2]dioxasilinane, 2,5-dimethyl-2-vinyl-[1,3,2]dioxasilinane, 2-methoxy-5-vinyl-[1,3,2]dioxasilinane, 2-methoxy-5-methyl-2-vinyl-[1,3,2]dioxasilinane, 2-methoxy-5,5-dimethyl-2-vinyl-[1,3,2]dioxasilinane, 5-isopropyl-2-methoxy-2-vinyl-[1,3,2]dioxasilinane and 5-hexyl-2-methoxy-2-vinyl-[1,3,2]dioxasilinane.

It will be understood herein that synthetic methods employed by one skilled in the art in reaction (I) may result in a distribution of various olefinically unsaturated[1,3,2]-dioxasilinane composition, wherein mixtures of the starting components are employed for the purpose of generating mixtures of cyclic moieties or cyclic and bridging moieties in the silane products. Moreover, it is understood that the partial hydrolyzates and/or condensates of these cyclic moieties or cyclic and bridging moieties, can be encompassed by the silanes herein as a side product of most methods of manufacture of the cyclic moiety containing silanes or cyclic and bridging moiety containing silanes. Also, the partial hydrolyzates and/or condensates can occur upon storage of the cyclic moiety containing or cyclic and bridging moiety containing silanes, especially in humid conditions, or under conditions in which residual water remaining from their preparation is not completely removed subsequent to their preparation. Furthermore, partial to substantial hydrolysis of the cyclic or cyclic and bridging moiety containing silanes can be deliberately prepared by incorporating the appropriate stoichiometry or excess of water into the methods of preparation described herein for the silanes e.g., in reaction (I). Also, the siloxane content of the cyclic moiety containing or cyclic and bridging moiety-containing silanes can be deliberately prepared by incorporating the appropriate stoichiometry or excess of water into the methods of preparation for the silanes described herein such as reaction (I).

The olefinically unsaturated [1,3,2]-dioxasilinane compositions, which may contain byproducts and/or reactants of the reaction (I) described herein, if liquid, can be loaded on a carrier or a mixture of more than one carrier, such as a porous polymer, carbon black, or an inorganic filler, such as silica, alumina, various clays, etc. By loading a composition on a carrier, it is in solid form for delivery to the polyolefin formulation of reaction (II). In another embodiment, the carrier would be part of the filler, either intimately absorbed onto or within, or chemically bound to the filler.

The olefinically unsaturated [1,3,2]-dioxansilinane described herein is made by the process of reacting a silane possessing an olefinically unsaturated moiety and at least two alkoxy groups, with a 1,3-diol. These olefinically unsaturated [1,3,2]-dioxasilinanes can be prepared, as described above, by the transesterification of olefinically unsaturated silane containing at least two alkoxy groups with a 1,3-diol, with or without a catalyst, by the esterification of the alkoxy groups with the 1,3-diol to generate olefinically unsaturated [1,3,2]-dioxansilinane compositions.

The transesterification of these alkoxy silanes with 1,3-diol can be conducted with or without a catalyst. If a catalyst is used it may be an acid, such as the aliphatic carboxylic acids and dicarboxylic acids described herein, a base or even a transition metal catalyst. Other suitable acid catalysts are hydrochloric acid, p-toluenesulfonic acid and the like. Typical base catalysts are sodium methoxide and sodium ethoxide. Suitable transition metal catalysts are tetraisopropyl titanate, titanium-containing chelates, zirconium alkoxides and zirconium-containing chelates. The amount of catalyst which can be employed in reaction (I) as described herein can be set by those skilled in the art, but generally can comprise from about 0.01 to about 2 weight percent catalysts, based on the total weight of reactants in reaction (I) described herein.

In one embodiment of the present invention, the olefinically unsaturated [1,3,2]-dioxasilinane composition can be prepared by reacting a catalyzed mixture of olefinically unsaturated silane containing at least two alkoxy groups and 1,3-diol with simultaneous distillation. The reaction leads to the alcohol exchange of one or more of the alkoxy groups selectively at the silicon atom of the alkoxy-functional silane reactant with the diol. The reaction is driven by the removal of the more volatile by-product alcohol by distillation. Suitable catalysts include acids such as p-toluenesulfonic acid, sulfuric acid, hydrochloric acid, chloroacetic acids, phosphoric acid, their mixtures and so forth; bases such as sodium ethoxide; and, transition metal-containing catalysts such as titanium alkoxides, titanium-containing chelates, zirconium alkoxides, zirconium-containing chelates and mixtures thereof. It will be understood herein that any catalyst employed could be systematically removed prior to the grafting reaction described herein.

In yet another embodiment of the present invention, the olefinically unsaturated [1,3,2]-dioxasilinane composition can be prepared by catalyzing a mixture of olefinically unsaturated silane containing at least two alkoxy groups and 1,3-diol, in a first embodiment, at a molar ratio of at least about 0.5 moles of diol per alkoxy-silyl group to be transesterified, in a second embodiment, at a molar ratio of from about 0.5 to about 1.5 for a trialkoxy silane; and, in a third embodiment, from about 1.0 to about 1.5 for a trialkoxy silane. In each of the foregoing embodiments, the reaction temperature can range from about 10° C. to about 200° C. and in another embodiment from about 30° C. to about 90° C. while maintaining a pressure in the range of from about 0.1 to about 2000 mm Hg absolute, and in another embodiment, from about 1 to about 80 mm Hg absolute. Excess diol can be utilized to increase reaction rate. The period for the reaction (I) can be from about 30 minutes to about 48 hours, more specifically from about 1 hour to about 8 hours.

In another embodiment the olefinically unsaturated [1,3,2]-dioxasilinane composition can be prepared by slowly adding diol to olefinically unsaturated alkoxy silane in the presence of catalyst at the desired reaction temperature and under vacuum. If desired, a neutralization step can be utilized to neutralize any acid or base catalyst that may have been utilized thereby improving product storage.

The olefinically unsaturated [1,3,2]-dioxasilinane composition can be further purified to remove the byproducts and unreacted reactants by distillation. The further purification will increase to molar amount of the olefinically unsaturated [1,3,2]-dioxasilinane in the olefinically unsaturated [1,3,2]-dioxasilinane composition, which produces a more reactive olefinically unsaturated [1,3,2]-dioxasilinane composition with moisture.

Optionally, an inert solvent can be used in the reaction (I) herein. The solvent herein can serve as a diluent, carrier, stabilizer, refluxing aid or heating agent. Generally, any inert solvent, i.e., one which does not enter into the reaction or adversely affect the reaction, can be used. In one embodiment, solvents are those which are liquid under normal conditions and have a boiling point below about 150° C. Examples include aromatics, hydrocarbons, ethers, aprotic solvents and chlorinated hydrocarbon solvents such as, toluene, xylene, hexane, butane, diethyl ether, dimethylformamide, dimethyl sulfoxide, carbon tetrachloride, methylene chloride and so forth.

In another embodiment of the present invention, the olefinically unsaturated [1,3,2]-dioxansilinane composition can be prepared by continuously premixing the flow-streams of olefinically unsaturated silane containing at least two alkoxy groups, diol and catalyst (when employed) at appropriate ratios and then introducing the premixed reactants into a reactive distillation system, in one embodiment, a thin film distillation device operating at the desired reaction temperature and vacuum conditions. Conducting the reaction in a thin film under vacuum accelerates the removal of the alcohol by-product and improves the transesterification reaction rate. The vaporization and removal of the by-product alcohol from the film shifts the chemical equilibrium of the reaction to favor formation of the desired product and minimizes undesired side reactions.

The foregoing embodiment of the process herein comprises the steps of:

a) reacting, in a thin film reactor, a thin film reaction medium comprising an olefinically unsaturated silane containing at least two alkoxy groups, 1,3-diol and catalyst to provide olefinically unsaturated [1,3,2]-dioxansilinane, and by-product alcohol;

b) vaporizing the by-product alcohol from the thin film to drive the reaction;

c) recovering the olefinically unsaturated [1,3,2]-dioxasilinane reaction product;

d) optionally, recovering the by-product alcohol by condensation; and, e) optionally, neutralizing the olefinically unsaturated [1,3,2]-dioxasilinane reaction product to improve its storage stability.

The molar ratio of 1,3-diol to olefinically unsaturated silane containing at least two alkoxy groups reactant used in the foregoing continuous thin film process will depend upon the number of alkoxy groups that are desired to be replaced with 1,3-diol. In one embodiment of the thin film process, a stoichiometric equivalent molar ratio of about 1 is used wherein one diol replaces two alkoxy groups. Generally, for the practice of this embodiment, the molar ratio of 1,3-dial to olefinically unsaturated silane containing at least two alkoxy groups can be varied within a range of from about 95 to about 125 percent of stoichiometric equivalence for each alkoxy-silyl group to be transesterified. In a particular embodiment, the molar ratio of 1,3-diol to olefinically unsaturated silane containing at least two alkoxy groups can be within the range of from about 100 to about 110 percent of stoichiometric equivalence. In another embodiment, the molar ratio can be within a range of from about 100 to about 105 percent of stoichiometric equivalence for the molar ratio of 1,3-diol to olefinically unsaturated silane containing at least two alkoxy groups. Those skilled in the art will recognize that excess 1,3-diol could be utilized to increase reaction rates but such is ordinarily of no significant advantage when conducting the reaction in a thin film and only adds to the expense. It is understood herein that the aforementioned amounts can be used in any of the reactions (I) described herein.

The apparatus and method of forming the film can be any of those known in the art. Typical known devices include falling film or wiped film evaporators. Minimum film thickness and flow rates will depend on the minimum wetting rate for the film forming surface. Maximum film thickness and flow rates will depend on the flooding point for the film and apparatus. Vaporization of the alcohol from the film is effected by heating the film, by reducing pressure over the film or by a combination of both. It is preferred that mild heating and reduced pressure are utilized to form the olefinically unsaturated [1,3,2]-dioxasilinane reaction product. Optimal temperatures and pressures (vacuum) for running the thin film process will depend upon the specific starting olefinically unsaturated silane's alkoxy groups and 1,3-diol used in the process. The present invention will be described more specifically by referring to the exemplary embodiments thereof. However, it should be noted that the present invention is not limited only to the following exemplary embodiments.

If desired, a chain transfer agent can, optionally, be employed in the present invention to deactivate any portion of the free radical initiator used in the grafting of the olefinically unsaturated [1,3,2]-dioxasilinane reaction product to the polyolefin, which remains unreacted after reaction (II) is completed to the desired extent. Examples of suitable chain transfer agents are dodecyl mercaptan, t-butyl mercaptan, n-butyl mercaptan, octyl mercaptan and alpha-methylstyrene. The chain transfer agent inhibits the crosslinking reaction and permits the silane grafting reaction to proceed effectively.

According to an embodiment of the present invention, the chain transfer agent may be a paraffin such as methane, ethane, propane, butane, and pentane; alpha-olefins such as propylene, butene-1, and hexene-1; aldehydes such as form aldehyde, acetaldehyde, and n-butylaldehyde; ketones such as acetone, methyl ethyl ketone, and cyclohexanone; aromatic hydrocarbons, and chlorohydrocarbons.

Further, when such a chain transfer agent is used, it may be present in the amount of from about 0.01 to about 0.5 weight percent based on the weight of the polyolefin. According to another embodiment, the chain transfer agent can be used in the amount of from about 0.03 to about 0.1 weight percent, based on the weight of the polyolefin.

As stated above, the introduction of the silane into the structure of the polyolefin to be crosslinked in reaction (II) should ordinarily be accomplished under substantially anhydrous conditions in order to preclude any significant amount of premature hydrolysis and condensation of [1,3,2]-dioxasilinane ring structure grafted onto the polyolefin. Only after the selected olefinically unsaturated [1,3,2]-dioxasilinane or composition has been chemically grafted into the selected polyolefin(s) will the crosslinkable composition be exposed to a source of moisture that will result in hydrolysis and condensation whereby the polyolefin(s) will become crosslinked through the grafted [1,3,2]-dioxasilinane ring structure.

The crosslinking produces a silane-crosslinked polyolefin made by the process(es) described herein.

Optionally, blowing agents can be incorporated in the present invention to produce polyolefin foams. The blowing agents are blowing agents that decompose at a temperature of more than about 140° C. to generate gas. According to another embodiment, the blowing agents decompose from about 170° C. to about 220° C. to generate gas. According to another embodiment, the blowing agent is azodicarbonamide, dinitrosopentamethylenetetramine, p,p'-oxybis(benzenesulfonylhydrazide), N,N'-dimethyl-N,N'-dinitrosoterephthalamide and the like, or a physical blowing agent such as hydrocarbons (for example, butane, pentane) and halogenated hydrocarbons (for example, methylchloride). The above-enumerated blowing agents can be used individually or in any combination thereof. According to another embodiment, the blowing agent is azodicarbonamide. Azodicarbonamide is especially advantageous because of its good thermal stability and suitable decomposition temperature.

The amount of the blowing agent can be varied over a wide range according, for example, to the degree of expansion required of the final foamed shaped article. Usually, the blowing agent is present in the amount of at least about 0.1 weight percent based on the weight of the polyolefin. According to another embodiment, the blowing agent may be present in the amount of about 1 to about 30 weight percent, based on the weight of the polyolefin.

When a heat-decomposition blowing agent is employed, the free radical initiator used for introducing olefinically unsaturated [1,3,2]-dioxasilinane ring structure into the structure of the polyolefin to be crosslinked advantageously has the same or similar decomposition temperature as that of the blowing agent, thus decomposing simultaneously with the decomposition of the blowing agent. The one embodiment free radical initiator can be an organic peroxide having a decomposition temperature of greater than about 140° C., e.g., a decomposition temperature in the range of about 170° C. to about 220° C.

Optionally, one or more known and conventional additives can be included in the composition of the present invention including, for example, carbon black, talc, calcium carbonate, foaming agents, lubricants, antioxidants, compatibilisers, mineral fillers, flame-retardant additives, stabilizers inhibiting deterioration by ultraviolet rays, stabilizers inhibiting deterioration by heavy metals, coloring agents, fillers, plasticizers, processing aids, pigments, heat stabilizers, compatibilizing agents, alumina trihydrate, magnesium hydroxides, zeolites, chalk, mica, silica, or silicates, and stabilizers against electric voltage.

According to another embodiment of the present invention, the coloring agent can be cadmium yellow, quinacridone red, cobalt blue, cadmium red, red iron oxide, titanium oxide, zinc oxide or carbon black; nucleating agents can be talc, diatomaceous earth, calcium carbonate, zinc stearate or and aluminum stearate; lubricants can be paraffin or stearic acid; stabilizer can 2-hydroxy-4-methoxybenzophenone or 2,6-ditert-butyl hydroxytoluene; fire retardants can be antimony oxide or chlorinated paraffin; fillers can be calcium oxide, magnesium oxide, sodium carbonate, potassium carbonate, strontium carbonate, barium sulfate, magnesium carbonate, calcium carbonate, silica, kaolin clay or talc; foaming aids can be zinc oxide, zinc stearate or zinc octanoate, and deterioration inhibitors can be t-butyl p-cresol or dilauryl thiopropionate in the amounts usually employed in the art.

According to another embodiment of the present invention, minerals for improving flame retardancy or as an internal source of water for the crosslinking, e.g. alumina trihydrate, magnesium oxide, zeolites or mineral fillers like chalk, talc, mica, silica, silicates or carbon black, can be used.

In accordance with another embodiment of the process of the invention, crosslinking of polyolefin is achieved by the process which comprises:

a) combining under substantially moisture-free conditions:
  (i) polyolefin,
  (ii) olefinically unsaturated [1,3,2]-dioxasilinane,
  (iii) a free radical initiator and, optionally,
  (iv) organic carboxylic acid hydrolysis and condensation catalyst for the crosslinking reaction of the resultant crosslinkable polyolefin containing at least one [1,3,2]-dioxasilinane ring structure when crosslinkable polyolefin containing at least one [1,3,2]-dioxasilinane ring structure is exposed to moisture;

b) heating the combination resulting from step (a) at a temperature above the crystalline melting point of polyolefin (i) to graft silane (ii) to polyolefin (i); and, c) exposing the product resulting from step (b) to moisture to effect hydrolysis and condensation of polyolefin containing at least one [1,3,2]-dioxasilinane ring structure, thereby providing silane-crosslinked polyolefin.

In accordance with another exemplary embodiment, step (a) in the foregoing process can be carried out by: (a1) combining polyolefin (i), olefinically unsaturated [1,3,2]-dioxasilinane (ii) and free radical initiator (iii) to provide a preblend in which olefinically unsaturated [1,3,2]-dioxasilinane (ii) and free radical initiator (iii) are physically incorporated in polyolefin (i); and, (a2) combining the preblend resulting from step (a1) with catalyst (iv). In conducting (a1), the olefinically unsaturated [1,3,2]-dioxasilinane (ii) and free radical initiator (iii) can be, if desired, combined to form a mixture, the resulting mixture thereafter being combined with polyolefin (i) to form the preblend.

In conducting step (a2), the polyolefin (i) and organic carboxylic acid catalyst (iv) can, if desired, be combined to provide a mixture, the resulting mixture thereafter being combined with the preblend resulting from step (a1).

Polyolefin (i) is any polyolefin or combination of polyolefins, described above, into which silane is introduced prior to crosslinking. Polyolefin (i) is typically provided in pellet or granular form.

Olefinically unsaturated [1,3,2]-dioxasilinane (ii) suitable for grafting onto and crosslinking with polyolefin (i) according to the present invention includes olefinically unsaturated [1,3,2]-dioxasilinane or compositions containing olefinically unsaturated [1,3,2]-dioxasilinane resulting from its production, as described above.

The amount of olefinically unsaturated [1,3,2]-dioxasilinane (ii) employed will be that which provides the desired degree of crosslinking in the subsequent crosslinking reaction. The amount of olefinically unsaturated [1,3,2]-dioxasilinane (ii) is based on the weight of the polyolefin (i), e.g., polyethylene, and is not narrowly critical and can range from about 0.1 to about 10 weight percent of olefinically unsaturated [1,3,2]-dioxasilinane (ii) based on the weight of polyolefin (i). According to another embodiment, the olefinically unsaturated [1,3,2]-dioxasilinane ranges from about 0.5 to about 3 weight percent based on the total weight of the polyolefin (i). In one non-limiting embodiment herein the amount of polyolefin is from weight percent to weight percent, more specifically from about 89.9 weight percent to 99.9 weight percent, based on the total weight of the polyolefin (i) and olefinically unsaturated [1,3,2]-dioxasilinane (ii). According to yet another embodiment, the olefinically unsaturated [1,3,2]-dioxasilinane (ii) ranges from about 0.5 to about 2.0 weight percent based on the total weight of the polyolefin (i) and all ranges therebetween. It will be understood herein that these aforementioned amounts apply equally to any of the grafting reactions (II) described herein.

Free radical initiators suitable for initiating the grafting of silane (ii) onto the polyolefin (i) include any of the free radical initiators described above.

The organic carboxylic acid used as hydrolysis and condensation catalysts suitable for crosslinking the polyolefin containing at least one [1,3,2]-dioxansilinane include the catalysts described above.

In one embodiment, the crosslinking of polyolefin is achieved by the process which comprises:
  a) combining under substantially moisture-free conditions:

(i) polyolefin,
(ii) olefinically unsaturated [1,3,2]-dioxasilinane,
(iii) a free radical initiator,
(iv) organic carboxylic acid used as a hydrolysis and condensation catalyst for the crosslinking reaction of the resultant crosslinkable polyolefin containing at least one [1,3,2]-dioxasilinane ring structure when crosslinkable polyolefin containing at least one [1,3,2]-dioxasilinane ring structure is exposed to moisture, and
(v) an anti-oxidant for stabilizing the free radical initiator
b) heating the combination resulting from step (a) at a temperature above the crystalline melting point of polyolefin (i) to graft silane (ii) to polyolefin (i); and,
c) exposing the product resulting from step (b) to moisture to effect hydrolysis and condensation of polyolefin containing at least one [1,3,2]-dioxasilinane ring structure, thereby providing silane-crosslinked polyolefin, wherein the olefinically unsaturated[1,3,2]-dioxasilinane (ii), a free radical initiator (iii), an organic carboxylic acid (iv) and anti-oxidant (vi) are mixed to form a silane graftable composition prior to combining with the polyolefin in step a). The anti-oxidant (v) is used to stabilize the free radical initiator (iii) during storage.

An anti-oxidant is any substance that prevents or repairs the process of oxidation, especially when the oxidation is promoted by oxygen, organic peroxides, organic peresters and azo compounds or act against the effects of free radicals. Typical anti-oxidants include substituted phenols and substituted polyphenols, derivatives of phenylenediamine, ascorbic acid, tocopherols, tocotrienol, resveratrol, flavonoids, carotenoids and hydroxylamino compounds. Typical anti-oxidants include N,N'-di-2-butyl-1,4-phenylenediamine, 2,6-di-tert-butyl-4-methylphenol, 2,4-dimethyl-6-ter-butylphenol, 2,6-di-tert-butylphenol, propyl gallate, tertiary butylhydroquinone and butylated hydroxyl anisole.

In another embodiment, the silane graftable composition comprises from about 70 to about 99.79 weight percent, more specifically from about 76 to about 98.9 weight percent and even more specifically from about 85 to about 98 weight percent of an olefinically unsaturated[1,3,2]-dioxasilinane (ii), from about 0.1 to about 10 weight percent, more specifically from about 0.5 to about 8 weight percent and even more specifically from about 1 to about 5 weight percent free radical initiator (iii), from about 0.1 to about 10 weight percent, more specifically from about 0.5 to about 8 weight percent, more specifically from about 1 to about 5 weight percent organic carboxylic acid (iv) and from about 0.01 to about 10 weight percent, more specifically from about 0.1 to about 8 weight percent and even more specifically from about 1 to about 5 weight percent anti-oxidant (vi), said weight percents based on the sum of the weights of olefinically unsaturated[1,3,2]-dioxasilinane (ii), free radical initiator (iii), organic carboxylic acid (iv) and anti-oxidant (vi).

In still another embodiment, the silane graftable composition comprises an olefinically unsaturated[1,3,2]-dioxasilinane (ii) having the general Formula (I):

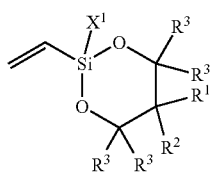
(I)

where $R^1$ is a straight chain or branched alkyl group of from 1 to 6 carbon atoms or hydrogen;

$R^2$ is a straight chain or branched alkyl group of from 1 to 6 carbon atoms, a cycloalkyl group of from 5 to 8 carbon atoms or hydrogen;

each occurrence of $R^3$ is independently a straight chain or branched alkyl group of from 1 to 6 carbon atoms or hydrogen;

$X^1$ is methyl, $-OR^6$, where $R^6$ is an alkyl group of from 1 to 8 carbon atoms,

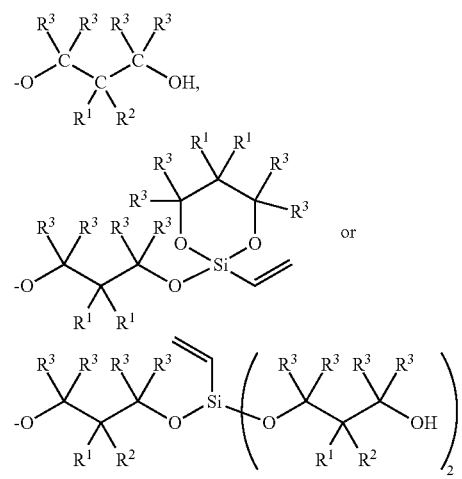

wherein $R^1$ is a straight chain or branched alkyl group of from 1 to 6 carbon atoms or hydrogen, $R^2$ is a straight chain or branched alkyl group of from 1 to 6 carbon atoms, a cycloalkyl group of from 5 to 8 carbon atoms or hydrogen, and each occurrence of $R^3$ is independently a straight chain or branched alkyl group of from 1 to 6 carbon atoms or hydrogen; a free radical initiator (iii) selected from the group consisting of organic peroxides and organic peresters; an organic carboxylic acid (iv) having Formula (III):

(III)

wherein G is a monovalent or polyvalent hydrocarbon containing up to 28 carbon atoms selected from the group consisting of alkyl, cycloalkyl, alkenyl, cycloalkenyl, aryl, aralkyl and arenyl; and the subscripts a and b are independently integers wherein a is 0 or 1 and b is 1 to 3; and an anti-oxidant (v) selected from the group consisting of substituted phenols, substituted polyphenols, ascorbic acid, derivatives of phenylene diamine, tocopherols, tocotrienol, resveratrol, flavonoids, carotenoids and substituted piperidine 1-oxyl compounds.

More specifically, the graftable silane composition comprises an olefinically unsaturated[1,3,2]-dioxasilinane (ii) having the general Formula (I), wherein $R^3$ is hydrogen, $R^1$ a straight chain or branched alkyl group of from 1 to 6 carbon atoms or hydrogen, $R^2$ is a straight chain or branched alkyl group of from 1 to 6 carbon atoms, a cycloalkyl group of from 5 to 8 carbon atoms, a free radical initiator (iii) selected from the group consisting of organic peroxides and organic peresters, an organic carboxylic acid (iv) having Formula (III), wherein G is a monovalent hydrocarbon group having from 6 to 18 carbon atoms and having the Formula (V):

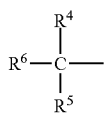 (V)

wherein each $R^4$, $R^5$ and $R^6$ is independently an alkyl group having from 1 to 15 carbon atoms with the proviso that the sum of carbon atoms in $R^4$, $R^5$ and $R^6$ groups is from 5 to 17 carbon atoms, a is 0 and b is 1, and an anti-oxidant selected from the group consisting of substituted phenols, substituted polyphenols, derivatives of phenylene diamines and substituted piperidine 1-oxyl compounds.

In yet still another embodiment, the graftable silane composition comprises at least one olefinically unsaturated [1,3,2]-dioxasilinane (ii) selected from the group consisting of 2-methyl-3-(5-methyl-2-vinyl-[1,3,2]dioxasilinan-2-yloxy)-propan-1-ol, 2-methyl-2-vinyl-[1,3,2]dioxasilinane, 2,5-dimethyl-2-vinyl-[1,3,2]dioxasilinane, 2-methoxy-2-vinyl-[1,3,2]dioxasilinane, 2-methoxy-5-methyl-2-vinyl[1,3,2]dioxasilinane, 2-methoxy-5,5-dimethyl-2-vinyl-[1,3,2]dioxasilinane, 5-isopropyl-2-methoxy-2-vinyl-[1,3,2]dioxasilinane and 5-hexyl-2-methoxy-2-vinyl-[1,3,2] dioxasilinane; at least one free radical initiator (iii) selected from the group consisting of benzoyl peroxide, dichlorobenzoyl peroxide, dipropionyl peroxide, t-butyl peroxyisobutyrate or lauroyl peroxide dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 1,3-bis(t-butyl-peroxyisopropyl)benzene, t-butyl peracetate, t-butyl peroxy-2-ethyl hexanoate, t-butyl peroxy isobutyrate, t-butyl peroxy benzoate, 2,5-di(peroxybenzoate)hexyl-3, di-t-butyldiperoxy phthalate, 2,5-dimethyl-2,5-di(benzoyl peroxy)hexane, t-butylperoxy maleate, t-butylperoxy isopropyl carbonate; at least one organic carboxylic acid (iv) selected from the group consisting of lauric acid, capric acid, myristic acid, palmitic acid, oleic acid, stearic acid, behenic acid, arachidic acid, 12-hydroxystearic acid, ricinolic acid, montanic acid, oxalic acid, malonic acid, succinic acid, glutaric acid, adipic acid, pimelic acid, suberic acid, azelic acid, sebacic acid, phthalic acid, 2,2-dimethylhexanoic acid, 2-ethyl-2,5-dimethylhexanoic acid, 2,2-dimethyloctanoic acid, and 2-ethyl-2,11-dimethyldodecanoic acid; and at least anti-oxidant (v) selected from the group consisting of substituted phenols and substituted polyphenols.

More specifically, the graftable composition comprises at least one olefinically unsaturated [1,3,2]-dioxasilinane (ii) selected from the group consisting of 2-methyl-3-(5-methyl-2-vinyl-[1,3,2]dioxasilinan-2-yloxy)-propan-1-ol, 2,5-dimethyl-2-vinyl-[1,3,2]dioxasilinane, 2-methoxy-5-methyl-2-vinyl-[1,3,2]dioxasilinane, 2-methoxy-5,5-dimethyl-2-vinyl-[1,3,2]dioxasilinane, 5-isopropyl-2-methoxy-2-vinyl-[1,3,2]dioxasilinane and 5-hexyl-2-methoxy-2-vinyl-[1,3,2] dioxasilinane; at least one free radical initiator (iii) selected from the group consisting of benzoyl peroxide, dipropionyl peroxide, t-butyl peroxyisobutyrate, lauroyl peroxide dicumyl peroxide, 2,5-dimethyl-2,5-di(t-butyl-peroxy) hexane, 2,5-dimethyl-2,5-di(t-butyl-peroxy)hexyne-3, di-t-butyl peroxide, 1,3-bis(t-butyl-peroxyisopropyl)benzene, t-butyl peracetate, t-butyl peroxy-2-ethyl hexanoate, t-butyl peroxy isobutyrate, t-butyl peroxy benzoate, 2,5-di(peroxybenzoate)hexyl-3, di-t-butyldiperoxy phthalate, 2,5-dimethyl-2,5-di(benzoyl peroxy)hexane, t-butylperoxy maleate and t-butylperoxy isopropyl carbonate; at least one organic carboxylic acid (iv) selected from the group consisting of 2,2-dimethylhexanoic acid, 2-ethyl-2,5-dimethylhexanoic acid, 2,2-dimethyloctanoic acid, and 2-ethyl-2,11-dimethyldodecanoic acid; and at least anti-oxidant (v) selected from the group consisting of substituted phenols and substituted polyphenols.

In one embodiment herein, a carrier polymer (vi) can optionally be used in the present invention, as is, more specifically as a solid, and should be compatible with polyolefin (i). "Compatible" means that the carrier polymer will not readily react with olefinically unsaturated [1,3,2]-dioxasilinane (ii) and will be dispersible or soluble in the polyolefin (i) at the melt temperature of the latter. Examples of suitable carrier polymers are non-hygroscopic, that is, absorption of moisture is comparatively low to minimize the possibility of premature hydrolysis and condensation of the olefinically unsaturated [1,3,2]-dioxasilinane (ii). In any event, the optional carrier polymer (vi) should be substantially free of water. In general, carrier polymers of the present invention are particulates in the form of powder, granules, or pellets. According to another embodiment of the present invention, the particulates are in the form of pellets.

Carrier polymer (vi) must be capable of physically incorporating a olefinically unsaturated [1,3,2]-dioxasilinane (ii) as described above while still retaining its particulate and solid characteristics. Three classes of suitable carrier polymer (vi) are porous, sponge-like carrier polymers, swellable carrier polymers and encapsulates.

Porous polymers are capable of incorporating the olefinically unsaturated [1,3,2]-dioxasilinane (ii) in the pores. Porous sponge-like carrier polymers suitable for taking up olefinically unsaturated [1,3,2]-dioxasilinane (ii) can be prepared, for example, from various high and low density polyethylenes and polypropylenes. According to an embodiment, the carrier polymer can be ethylene vinyl acetate (EVA) copolymer, high density polyethylene, low density polyethylene or linear low density polyethylene. The pore volume of the porous polymer is large enough to hold a relatively large volume of olefinically unsaturated [1,3,2]-dioxasilinane. The pore volume is generally from about 10 to about 90 percent of the porous polymer. According to another embodiment of the present invention, the pore volume is from about 30 to about 90 percent. The cross-section of the pores is generally in the range of about 0.1 to about 0.5 μm and the cell size is generally from about 1 to about 30 μm. These porous polymers can take up from about 0.5 to about three times their weight of silane. The porous polymers can be employed as carrier polymers (vi) in powder, granular, or pellet form. Suitable porous polymers are commercially available.

Swellable polymers are capable of incorporating the olefinically unsaturated [1,3,2]-dioxasilinane (ii) by being swelled by the olefinically unsaturated [1,3,2]-dioxasilinane (ii). The carrier polymer (vi) can also be chosen from polymers that are readily swelled by the silane (iii) and optionally the peroxide, hydrolysis and condensation catalyst, stabilizers, and other additives where these can be mixed with or dissolved in the olefinically unsaturated [1,3,2]-dioxasilinane (ii) to form a liquid mixture. One polymer suitable for this purpose is EVA, especially EVA having a high vinyl acetate content ranging from about 18 to about 45 percent by weight. Such a swellable carrier polymer can be used in granule, powder, pellet, or other solid form. According to another embodiment of the present invention, the carrier polymer (vi) should be chosen so that the amount of olefinically unsaturated [1,3,2]-dioxasilinane (ii) that it can absorb without becoming wet or sticky is a minimum of about 10 percent by weight, based on the weight of the carrier polymer (vi).

In practice it has been found that suitable swelled pellets containing about 20 percent olefinically unsaturated [1,3,2]-dioxasilinane can be prepared from EVA made from 26% vinyl acetate monomer. Polyethylene is not generally suitable as a swellable carrier polymer because it does not readily absorb sufficiently large amounts of silanes.

It will be understood herein that any carrier polymer (vi) that is employed, can in one embodiment, be different from polyolefin (i) used herein.

A third class of carrier polymer (vi) is an encapsulate. The olefinically unsaturated [1,3,2]-dioxasilinane is encapsulated, i.e., contained with a thermoplastic polymer capsule. Suitable polymers useful as encapsulates in the present invention are polyolefins. Suitable polyolefins can be either a homopolymer of an alpha-olefin having 2 to 6 carbon atoms or a copolymer of two alpha-olefins. For example, encapsulation of the olefinically unsaturated [1,3,2]-dioxasilinane (ii) in the carrier polymer (vi) would produce a suitable solid form of the olefinically unsaturated [1,3,2]-dioxasilinane (ii).

The amount of carrier polymer (vi) is ordinarily selected to be the minimum amount needed to contain the desired amount of olefinically unsaturated [1,3,2]-dioxasilinane (ii) and, optionally, one or more other additives in a dry, easily handled form.

Generally, absorption of the olefinically unsaturated [1,3,2]-dioxasilinane (ii), alone or with other additives in liquid form, into the carrier polymer (vi) in the process of the present invention is accomplished by tumble blending, the carrier polymer (vi), silane (ii), and, optionally, the other additives together. Tumble blending, for example, can be accomplished in a Conus blender. If not all additives are liquid, then any solid components should first be dissolved in the olefinically unsaturated [1,3,2]-dioxasilinane (ii). The blending is carried out under a blanket of nitrogen, carbon dioxide, or dry air in a closed system to maintain the olefinically unsaturated [1,3,2]-dioxasilinane (ii) substantially free of water and to minimize evaporation of the liquid ingredients. Optionally, during blending heat can be applied. The container in which the blending takes place must be non-reactive with the olefinically unsaturated [1,3,2]-dioxasilinane (ii) and other additives. The absorption of olefinically unsaturated [1,3,2]-dioxasilinane (ii) and any other liquid additive into the carrier polymer (vi) is carried out prior to feeding the olefinically unsaturated [1,3,2]-dioxasilinane (ii) into the mixing or compounding apparatus. Additives absorbed into the carrier polymer (vi) along with the olefinically unsaturated [1,3,2]-dioxasilinane (ii) can be incorporated, for example, at about 0.5 to about 50 weight percent of the carrier polymer (vi), in another embodiment from about 0.5 to about 10 weight percent, and in yet another embodiment from about 1.0 to about 2.5 weight percent and all ranges therebetween, based on the weight of the carrier polymer (vi).

The process of the present invention can be carried out employing any suitable apparatus. According to an embodiment of the present invention, the process is carried out under conditions in which the polyolefin (i) and solid carrier polymer (vi) containing olefinically unsaturated [1,3,2]-dioxasilinane of the present invention are subjected to mechanical working, such as kneading or compounding. The process is, therefore, carried out in, for example, an extruder. The use of such an apparatus to produce a crosslinked polyolefin is explained in detail in U.S. Pat. No. 5,112,919, the contents of which are incorporated by reference in its entirety herein. Common extruders are the single or twin screw type. Other apparatus that can be employed can include a Buss Coknedaer or a Banbury mixer. Such compounding equipment may be preferred to an extruder where the grafting reaction is to be performed and then the polyolefin containing at least one [1,3,2]-dioxasilinane ring structure is to be stored for a period of time prior to crosslinking and fabrication of articles therefrom.

The polyolefin (i) and carrier polymer (vi) as described above are reacted in the molten state with a olefinically unsaturated [1,3,2]-dioxasilinane as described above.

The free radical initiator (iii) is incorporated into the polyolefin (i) to initiate the grafting reaction.

Subjecting the polyolefin containing at least one [1,3,2]-doxasilinane ring structure thus produced to moisture, optionally at an elevated temperature, will induce crosslinking of the polyolefin containing at least one [1,3,2]-doxasilinane ring structure via a combined hydrolysis and condensation reaction. Atmospheric moisture is usually sufficient to permit the crosslinking to occur, but the rate of crosslinking can be increased by the use of an artificially moistened atmosphere, or by immersion in liquid water. Also, subjecting the polyolefin containing at least one [1,3,2]-doxasilinane ring structure composition to combined heat and moisture will accelerate the crosslinking reaction. The crosslinking may be affected at a temperature above about 50° C. According to another embodiment, the crosslinking is performed by exposing the composition to a temperature of about 85° C. and a relative humidity of from about 50% to about 90% for up to 100 hours, or more specifically from about 30 seconds to about 6 hours, or even more specifically from about 30 seconds to about 4 hours. It will be understood herein that the aforementioned temperatures can be used in any crosslinking reactions (III) described herein. Any amount of polyolefin containing at least one [1,3,2]-doxasilinane ring structure can be used in any reaction (III) herein which is adequate for exposure to moisture, but in one non-limiting embodiment the amount of polyolefin containing at least one [1,3,2]-doxasilinane ring structure in reaction (III) is such that it can be from about 25 weight percent to about 100 weight percent, more specifically from about 50 weight percent to about 95 weight percent of the reaction mixture of reaction (III). The amount of moisture is from about 0.01 weight percent to about 5 weight percent, more specifically from about 0.1 weight percent to about 2.0 weight percent of the reaction mixture of reaction (III).

Alternatively, it may be desirable to store the crosslinkable polymer of the present invention for some time prior to crosslinking it and fabricating a product, so then the hydrolysis and condensation catalyst (iv) should not be added during the production of the polyolefin containing at least one [1,3,2]-doxasilinane ring structure. Instead, the organic carboxylic acid hydrolysis and condensation catalyst (iv) should be mixed with the polyolefin containing at least one [1,3,2]-doxasilinane ring structure at the crosslinking reaction step.

In one embodiment herein there is provided a silane crosslinkable polyolefin composition comprising a polyolefin containing at least one [1,3,2]-dioxansilinane ring structure, such as those described and/or made herein, and at least one organic carboxylic acid used as a hydrolysis and condensation catalyst.

Some applications to which the silane-crosslinked polyolefin can be applied are as composition for use in pipes, foams, insulator for wires and cables, domestic water pipelines, offshore oil and natural gas piping, and for the transportation of chemicals, slurries, sewage and the like.

The following nonrestrictive examples are further illustrative of the invention.

EXPERIMENTAL

Example 1. Preparation of Silane

Silane A was prepared by the following method: 6318 grams (2.22 moles) of vinyltriethoxy silane (Silquest®

A-151, available from GE Silicones), 4.7 grams of a sulfonated ion exchange resin (Purolite CT-275 catalyst, available from Purolite Co., Inc.) and 300.0 grams (2.22 moles) of 1,3-butanediol (available from Sigma-Aldrich Chemical Co.) were added to a 3 L round bottom flask equipped with an Oldershaw five plate distillation column, short path distillation head, and addition funnel. The contents of the flask were heated to about 40° C. under vacuum at about 60 mm Hg. The vacuum was slowly increased to maintain a steady distillation of ethanol. Distillation was continued until full vacuum and a pot temperature of about 60° C. was obtained. The material was then allowed to cool for about 12 hours and was filtered to yield approximately 536.0 g of Silane A.

Silane A was analyzed by nuclear magnetic resonance (NMR) spectroscopy on a Bruker AVANCE 600 Spectrometer operating at field strength of 14.1 T; 1H's resonate at 600 MHz. The sample is placed in a 10 mm NMR tube and diluted with 0.1M Cr(AcAc)3/CDCl3 to a final concentration of 0.05M. Inverse gated decoupling pulse sequence is used with a pulse width of 45-degrees and 30% duty cycle (13C: delay of 5 s, AQ of 1.65 s; 29Si: delay of 10 s, AQ of 1.42 s). The $^{13}$C NMR analysis of the sample indicates the major signals for the organo-functional group bonded to the Si are associated with vinyltrialkoxysilane. The alkoxy group is mainly 2-methyl-1,3-propanediol found either bridging two Si atoms, forming a cyclic by being attached to the same Si atom, or attach to one Si atom at one end with the other end free. The $^{13}$C NMR chemical shift assignments are $\delta$136.9-134.1 ppm, intensity 1.00, C=C carbon; $\delta$129.14-129.27 ppm, intensity 1.00, C=C carbon; $\delta$70.02-69.85 ppm, intensity 1.24 cyclic form of —OCH$_2$ carbons (two) bonded to the silicon atom; $\delta$64.85-64.85, intensity, carbon of —CH$_2$OH; $\delta$62.92-61.64, intensity 2.55, bridging form of —OCH$_2$ carbons (two) bonded to the silicon atom. An FTIR spectrum of the product indicated major peaks at 3361 cm$^{-1}$ (broad) due to OH stretch; 1600 cm$^{-1}$ due to C=C stretch; 1088 and 1044 cm$^{-1}$ due to COH and COSi stretch. GPC had a broad single peak with Mn of 770. GC/MS had peaks with m/e of 94 (2-methyl-1,3-propanediol and m/e of 374, a compound contain two silicon atoms at part of a 2-vinyl-5-methyl-[1,3,2]-doxasilinane ring structure bonded together through a —OCH$_2$CH(CH$_3$)CH$_2$O— bridging group.

Examples 2-5, Comparative Examples A

Table 1 describes the starting materials used for the investigation. Unless specified otherwise, all materials were used as received.

TABLE 1

| Ingredients | | |
|---|---|---|
| Chemical Name | Description | Supplier |
| 2-Methyl-3-(5-methyl-2-vinyl-[1,3,2]dioxasilinan-2-yloxy)-propan-1-ol | Product in provide as a composition containing bridging moieties and 2-methyl-1,3-propanediol, referred to as Silane A | Laboratory preparation |
| Butylated hydroxytoluene | BHT, antioxidant | Fisher Scientific |
| Di-tent-Butyl peroxide | Liquid peroxide | Sigma-Aldrich |
| Dicumyl peroxide | Solid, 95% crystal peroxide | Akzo Nobel Polymer |
| 1,1-Bis(tert-butylperoxy)-3,3,5-trimethylcyclohexane, | TMCH (Luperox ® 231, 92%) | Sigma-Aldrich |

TABLE 1-continued

| Ingredients | | |
|---|---|---|
| Chemical Name | Description | Supplier |
| Dioctyl tin dilaurate | DOTDL | Vertellus Performance Materials |
| Diobutyl tin dilaurate | DBTDL, 95% | Sigma-Aldrich |
| 2-Ethyl-2,5-dimethyl-hexanoic acid | VA-10 | Hexion Specialty Chemicals |
| Adipic Acid | ADA, di-functional acid, 99.6%, pKa's are 4.43 and 5.41 | Sigma-Aldrich |
| trans-Aconitic acid | ACA, tri-functional acid, 98%, pKa's are 2.80 and 4.46 | Sigma-Aldrich |
| Decanoic acid | DEA, 96%, pKa is 4.9 | Sigma-Aldrich |
| 2,2-Dimethyl-butyric acid | DMBA (96%) | Sigma-Aldrich |
| Linear low density Polyethylene | LL318, Density = 0.918 g/cc Melt flow = 2.7 g/10 min | Baskem |

The preparation of cross-linked polyethylene (XLPE) is consisted of the synthesis of silane grafted polyethylene followed by curing of silane grafted polyethylene in the presence of water at a temperature of 95° C. for 4 hours.

Synthesis of Silane Grafted Polyethylene

The synthesis of silane grafted polyethylene consisted of the preparation of graftable silane composition, often referred to as a silane cocktail, followed by the reaction of silane cocktail with polyethylene. All of the chemicals were used as supplied.

The graftable silane composition was prepared by mixing the ingredients at ambient temperatures. The compositions are presented in Table 2.

TABLE 2

| The chemical composition of silane cocktail. | | | | | | |
|---|---|---|---|---|---|---|
| Formulation of graftable silane composition | Silane A, grams | Anti-oxidant, BHT, grams | Peroxide, Di-t-butyl Peroxide, grams | Peroxide, Dicumyl peroxide, grams | Acid, Visatic acid-10, grams | % vinyl Content in silane cocktail |
| Example 2 | 97.59 | 0.04 | 1.67 | — | 0.7 | 9.5 |
| Example 3 | 91.22 | 0.05 | — | 4.73 | 4 | 8.9 |

Polyethylene was dried at a temperature of 80° C. for 4 hours in an air oven before use. In an oven dry beaker, a vinyl silane, peroxide, anti-oxidant and catalyst were stirred at a room temperature under nitrogen to make homogeneous solution (graftable silane composition). The dry polyethylene (200 grams) and silane graftable composition (4 grams) were taken in a glass jar and blended well by rotating the jar continuously using a two roll mill overnight.

The graftable silane composition (silane cocktail) coated polyethylene granules were then run through a DSM micro-extruder at a certain temperature profile to produce silane grafted polyethylene. At a high temperature extrusion process, vinyl double bonds of silane molecules react with polyethylene free radicals which were generated after the reaction of polyethylene and free radicals from peroxide.

The temperature profiles of the micro-extruder at feeding zone, mixing zone, and die head zone were 190° C., 210° C., and 210° C., respectively. The microextruder has a recycle valve attached to the die head. When the recycle valve is open, the molten polymer is forced to pass through a heated channel that connects to the feed zone. By opening the recycle valve for a certain time, molten polymer can be circulated between feed zone and die head zone of the micro-extruder. Thus, by opening the recycle valve for a certain time of interval, the molten polymer from the die head zone can be recirculated to the feeding zone which provides longer mixing and reaction time. The feeding time of silane cocktail coated polyethylene granules and the grafting reaction time were 45 seconds and 1 minute, respectively. Once the desired amount of mixing and reaction is achieved, the recycle valve can be closed that allows the molten polymer to come out of the die as a single strand. The transfer device of the micro-injection mold is used to collect the polymer melt from the micro-extruder and transfer the molten polymer to a dog-bone shaped injection mold. The transfer device and injection mold were set at a temperature of 210° C. and 60° C., respectively.

Synthesis of Cross-Linked Polyethylene

The synthesis of cross-linked polyethylene (XLPE) is described as follows: ISO 527-2-5A shaped dog bone specimens of silane grafted polyethylene obtained from micro-injection mold was placed in a hot water bath at a temperature of 95° C. for 4 hours to cure and produce XLPE.

Measurement of Mechanical Properties—Tensile Test

After curing, the dog bone shaped (ISO 527-2-5A) specimens were placed at a temperature of 21° C. and a humidity of 50% overnight before testing. Tensile test was carried out using an Instron tensile tester fitted with a 5 KN load cell. The displacement rate of the movable clamp was set as 2 inch/minute. Data reported was the average of 6 replicate measurements.

Measurement of Cross-Link Density—Gel Content

Gel content XLPE samples were carried out according to the procedure described in ASTM D 2765 at a temperature of 190° C. in a Soxhlet apparatus for 18 hours. The solvent used to extract the non-crosslinked portion of sample was decalin. Data reported was the average of 3 replicate measurements.

The results from the analysis of the crosslinked polyethylene are presented in Table 3.

XLPE-1 is the crosslinked polyethylene made using the graftable silane composition of Example 2. XLPE-2 is the crosslinked polyethylene made using the graftable silane composition of Example 3.

Data obtained from Table 3 shows that all of the XLPEs have higher Young's modulus, tensile stress at yield, energy at yield and lower elongation at break compared to a pure polyethylene sample. The Silane grafted XLPE-1 containing the lowest amount of catalyst showed relatively lower extent of cure and mechanical properties as compared to other XLPE-2. The weight proportion of polyethylene and graftable silane compositions were maintained as 2 grams of graftable silane composition per 100 grams of polyethylene. Thus, the initial concentration of vinyl group per 100 g of polyethylene is higher for polyethylene blended with graftable silane composition of Example 3.

In general, the olefinically unsaturated [1,3,2]-dioxasilinae of the present invention show improved performance as compared to uncrosslinked polyethylene and offer a significant benefit per the reduction in the amount of volatile organic compounds and are free of tin compounds.

Examples 6-25, Comparative Examples B-D

The synthesis of silane grafted polyethylene is consisted of the preparation of silane cocktail followed by the reaction of silane cocktail with polyethylene. All of the chemicals were used as supplied. Polyethylene was dried at a temperature of 80° C. for 4 hours in an air oven before use. In an oven dry 40 ml vial, a vinyl silane, peroxide, anti-oxidant and catalyst were stirred at a temperature of 50° C. under nitrogen to make homogeneous solution (graftable silane composition or silane cocktail). The compositions of the graftable silane compositions are presented in Table 4.

TABLE 4

Graftable silane compositions

| Formulation of graftable silane composition | Silane A, grams | Catalyst, grams | Peroxide, grams | Anti-oxidant, BHT | Peroxide Type | Catalyst Type |
|---|---|---|---|---|---|---|
| Example 6 | 88.95 | 3.00 | 8.00 | 0.05 | DICUP | VA10 |
| Example 7 | 92.95 | 3.00 | 4.00 | 0.05 | DICUP | VA10 |
| Example 8 | 87.63 | 7.00 | 5.32 | 0.05 | DICUP | VA10 |
| Example 9 | 88.95 | 3.00 | 8.00 | 0.05 | TMCH | VA10 |
| Example 10 | 92.95 | 3.00 | 4.00 | 0.05 | TMCH | VA10 |
| Example 11 | 86.98 | 7.00 | 5.97 | 0.05 | TMCH | VA10 |
| Comparative Example B | 88.95 | 3.00 | 8.00 | 0.05 | DICUP | DBTDL |
| Example 12 | 88.95 | 3.00 | 8.00 | 0.05 | DICUP | DEA |
| Example 13 | 88.95 | 3.00 | 8.00 | 0.05 | DICUP | DMBA |
| Example 14 | 88.95 | 3.00 | 8.00 | 0.05 | DICUP | ADA |
| Example 15 | 88.95 | 3.00 | 8.00 | 0.05 | DICUP | ACA |

TABLE 3

Results of the silane crosslinked polyethylene. Data obtained from tensile test and gel content for XLPE.

| Example | Sample | Young's modulus, psi | Tensile stress at yield, psi | Energy at yield, in-lbf | Elongation at Break (%) | Gel Content (%) |
|---|---|---|---|---|---|---|
| Comparative A | Polyethylene | 16642 ± 1040 | 1913 ± 62 | 17.1 ± 2.3 | 657 ± 65 | — |
| Example 4 | XLPE-1 | 19372 ± 2239 | 2714 ± 49 | 28.3 ± 1.7 | 180 ± 23 | 58 ± 7 |
| Example 5 | XLPE-2 | 20614 ± 1975 | 2757 ± 40 | 35 ± 2.9 | 180 ± 14 | 64 ± 2 |

The dry polyethylene and silane cocktail were taken at a ratio of 98:2 weight percentage in a glass jar and blended well by rotating the jar continuously using a two roll mill overnight. The silane cocktail coated polyethylene granules were then run through a DSM micro-extruder at a certain temperature profile to produce silane grafted polyethylene. At a high temperature extrusion process, vinyl double bonds of silane molecules react with polyethylene free radicals which were generated after the reaction of polyethylene and free radicals from peroxide.

The temperature profiles of the micro-extruder at feeding zone, mixing zone, and die head were 215° C., 220° C., and 220° C. and 170° C., 170° C., and 175° C. when the peroxides used were dicumyl peroxide and 1,1-bis(tert-butylperoxy)-3,3,5-trimethylcyclohexane, respectively. The microextruder has a recycle valve attached to the die head. When the recycle valve is open, the molten polymer is forced to pass through a heated channel that connects to the feed zone. By opening the recycle valve for a certain time, molten polymer can be circulated between feed zone and die head zone of the micro-extruder.

Thus, by opening the recycle valve for a certain time of interval, the molten polymer from the die head zone can be recirculated to the feeding zone which provides longer mixing and reaction time. The feeding time of silane cocktail coated polyethylene granules and the grafting reaction time were 45 seconds and 1 minute, respectively. Once the desired amount of mixing and reaction is achieved, the recycle valve can be closed that allows the molten polymer to come out of the die as a single strand. The transfer device of the micro-injection mold is used to collect the polymer melt from the micro-extruder and transfer the molten polymer to a dog-bone shaped injection mold. When dicumyl peroxide and 1,1-bis(tert-butylperoxy)-3,3,5-trimethylcyclohexane were used as peroxides, the transfer device was set at a temperature of 220° C. and 175° C., respectively. The injection mold was set at a temperature of 60° C. The synthesis of cross-linked polyethylene (XLPE) is described as follows: ISO 527-2-5A shaped dog bone specimens of silane grafted polyethylene obtained from micro-injection mold was placed in a hot water bath at a temperature of 95° C. for 4 hours to cure and produce XLPE.

Measurement of Mechanical Properties—Tensile Test

After curing, the dog bone shaped (ISO 527-2-5A) specimens were placed at a temperature of 21° C. and a humidity of 50% overnight before testing. Tensile test was carried out using an Instron tensile tester fitted with a 5 KN load cell. The displacement rate of the movable clamp was set as 0.2 inch/minute. Data reported was the average of 6 replicate measurements.

Measurement of Cross-Link Density—Gel Content

Gel content XLPE samples were carried out according to the procedure described in ASTM D 2765 at a temperature of 142° C. in a Soxhlet apparatus for 18 hours. The solvent used to extract the non-crosslinked portion of sample was p-xylene. Data reported was the average of 3 replicate measurements.

Table 5 reports the data from the analysis of the cross-linked polyethylene.

TABLE 5

Data obtained from tensile test and gel content for XLPE.

| Example | Graftable Silane Composition used to prepare crosslinked polyethylene | Young's Modulus (psi) | Elongation at break (%) | Yield Stress (psi) | Gel Content (%) |
|---|---|---|---|---|---|
| 16 | Example 6 | 14528 ± 444 | 207 ± 11 | 1877 ± 48 | 66.4 ± 3.0 |
| 17 | Example 7 | 14524 ± 801 | 195 ± 10 | 1769 ± 49 | 69.4 ± 2.1 |
| 18 | Example 8 | 14662 ± 486 | 205 ± 17 | 1767 ± 14 | 66.2 ± 2.5 |
| 19 | Example 9 | 15060 ± 606 | 152 ± 7 | 2130 ± 31 | — |
| 20 | Example 10 | 15495 ± 514 | 166 ± 15 | 1985 ± 76 | 69.5 ± 2.6 |
| 21 | Exmple 11 | 14873 ± 896 | 151 ± 6 | 2206 ± 78 | — |
| Comparative Example C | Comparative Example B | 17176 ± 406 | 185 ± 15 | 1836 ± 41 | 71.2 ± 1.4 |
| 22 | Example 12 | 15937 ± 471 | 172 ± 6 | 1897 ± 33 | 68.7 ± 3.0 |
| 23 | Example 13 | 15,757 ± 392 | 167 ± 8 | 1885 ± 11 | 66.4 ± 1.3 |
| 24 | Example 14 | 14,633 ± 295 | 192 ± 10 | 1836 ± 16 | 68.2 ± 1.9 |
| 25 | Example 15 | 14,325 ± 344 | 184 ± 18 | 1853 ± 48 | 67.6 ± 2.0 |
| Comparative Example D | None | 14,037 ± 456 | 720 ± 50 | 1440 ± 20 | 0.0 |

The data presented in Table 5 showed that XLPEs which were produced from the TMCH peroxide have higher moduli and yield stresses, and lower elongation at break than those produced from DICUP. This is because of the fact that TMCH is a di-peroxide while the DICUP is a mono-peroxide. Thus, the total number of free radical available to graft the vinyl silane onto polyethylene is higher as in case of XLPEs produced from TMCH as compared to those produced from DICUP.

The moduli and gel content of XPLEs obtained from graftable silane compositions (silane cocktail) containing di-functional acid (ADA) and tri-functional acid (ACA) are close to those obtained from mono-functional acid, VA-10. The melting points of ADA and ACA are 151° C. and 190° C. which were well above the water bath curing temperature (95° C.). Thus, these acid catalysts remain solid while water bath curing process and hinder the diffusion the moisture into the bulk of material. Additionally, the proton dissociation rate of these solid acids may be low as compared to the liquid acids such as DEA and DMBA. The VA-10 is a liquid acid and may have a weak dissociation constant.

The data in Table 5 illustrated that the crosslinked polyethylene of the present invention showed a significant improvement in cured properties relative to virgin polyethylene. The silane also did not volative organic compounds during cure, because the byproduct of crosslinking, 2-methyl-1,3-propanediol is a liquid compound dissolved within the crosslinked polyethylene matrix. Although the cured properties were somewhat better when the polyolefin containing at least one [1,3,2]-dioxasilinane ring structure was cured with a tin catalysts, such as dibutyl tin dilaurate, the compositions of the present invention are free of tin compounds.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A process for producing a silane-crosslinked polyolefin which comprises exposing a polyolefin containing at least one [1,3,2]-dioxasilinane ring structure to moisture in the presence of an organic carboxylic acid used as hydrolysis and condensation catalyst which does not contain tin, thereby producing the silane-crosslinked polyolefin, wherein the polyolefin contains at least one [1,3,2]-dioxasilinane ring structure and is made by the process of grafting an olefinically unsaturated [1,3,2]-dioxasilinane to a polyolefin in the presence of a free radical initiator, wherein the olefinically unsaturated [1,3,2]-dioxasilinane is given by general Formula (I):

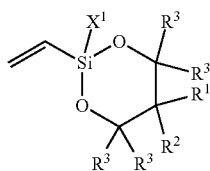
(I)

where $R^1$ is a straight chain or branched alkyl group of from 1 to 6 carbon atoms or hydrogen;
$R^2$ is a straight chain or branched alkyl group of from 1 to 6 carbon atoms or a cycloalkyl group of from 5 to 8 carbon atoms;
each occurrence of $R^3$ is hydrogen;
$X^1$ is

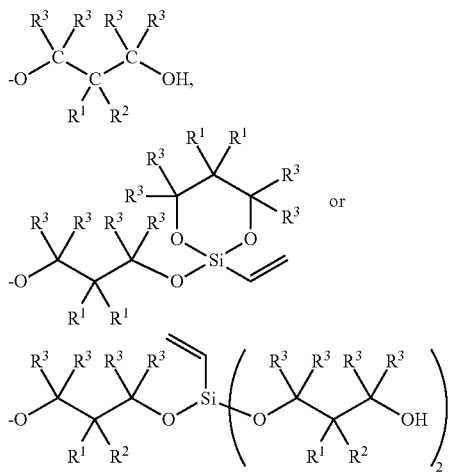

wherein $R^1$ is a straight chain or branched alkyl group of from 1 to 6 carbon atoms or hydrogen, $R^2$ is a straight chain or branched alkyl group of from 1 to 6 carbon atoms or a cycloalkyl group of from 5 to 8 carbon atoms, and each occurrence of $R^3$ is hydrogen and the organic carboxylic acid is at least one organic carboxylic acid having general Formula (III):

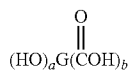
(III)

wherein G is a monovalent or polyvalent hydrocarbon containing up to 28 carbon atoms selected from the group consisting of alkyl, cycloalkyl, alkenyl, cycloalkenyl, aryl, aralkyl and arenyl; and the subscripts a and b are independently integers wherein a is 0 or 1 and b is 1 to 3.

2. The process of claim 1 wherein the polyolefin is polyethylene or a copolymer of ethylene and an alpha-olefin of 3 to 20 carbon atoms.

3. The process of claim 1 wherein the polyolefin is at least one member selected from the group consisting of homopolymers, copolymers, terpolymers, and tetrapolymers of ethylene, propylene, butene, pentene, hexene, heptene, octene, nonene, decene, dienes, cyclic dienes and aromatic dienes.

4. The process of claim 1 where the organic carboxylic acid, which is used as a hydrolysis and condensation catalyst and does not contain tin, is selected from the group consisting of 2,2-dimethylhexanoic acid, 2-ethyl-2,5-dimethylhexanoic acid, 2,2-dimethyloctanoic acid, and 2-ethyl-2,11-dimethyldodecanoic acid, lauric acid, capric acid, myristic acid, palmitic acid, oleic acid, stearic acid, behenic acid, arachidic acid, 12-hydroxystearic acid, ricinolic acid, montanic acid, oxalic acid, malonic acid, succinic acid, glutaric acid, adipic acid, pimelic acid, suberic acid, azelic acid, sebacic acid, phthalic acid and combinations thereof.

5. The process of claim 1 wherein the organic carboxylic acid, which is used as a hydrolysis and condensation catalyst and does not contain tin, is at least one organic carboxylic acid having the general Formula (III):

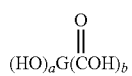
(III)

wherein G is a monovalent hydrocarbon group having from 6 to 18 carbon atoms and has the Formula (V):

(V)

$$R^6-\underset{\underset{R^5}{|}}{\overset{\overset{R^4}{|}}{C}}-$$

wherein each of $R^4$, $R^5$ and $R^6$ is independently an alkyl group having from 1 to 15 carbon atoms with the proviso that the sum of carbon atoms in $R^4$, $R^5$ and $R^6$ groups is from 5 to 17 carbon atoms, a is 0 and b is 1.

6. The process of claim 5 wherein the organic carboxylic acid is selected from the group consisting of 2,2-dimethylhexanoic acid, 2-ethyl-2,5-dimethylhexanoic acid, 2,2-dimethyloctanoic acid, 2-ethyl-2,11-dimethyldodecanoic acid and combinations thereof.

7. The process of claim 1 wherein the amount of [1,3,2]-dioxasilinane ring structure moieties in the total grafting reaction mixture is greater than about 5 mole percent based on the moles of silicon atoms in the total grafting reaction mixture.

8. The process of claim 1 wherein the grafting of olefinically unsaturated [1,3,2]-dioxasilinane to a polyolefin is conducted in the presence of a free-radical initiator wherein the free-radical initiator is selected from the group consisting of organic peroxides, organic peresters, azo compounds and combinations thereof.

9. The process of claim 1 further comprising:
   a) combining under anhydrous conditions:
      (i) polyolefin,
      (ii) olefinically unsaturated [1,3,2]-dioxasilinane,
      (iii) a free radical initiator,
      (iv) organic carboxylic acid used as a hydrolysis and condensation catalyst for the crosslinking reaction of the resultant crosslinkable polyolefin containing at least one [1,3,2]-dioxasilinane ring structure when crosslinkable polyolefin containing at least one [1,3,2]-dioxasilinane ring structure is exposed to moisture, and
      (v) an anti-oxidant for stabilizing the free radical initiator
   b) heating the combination resulting from step (a) at a temperature above the crystalline melting point of polyolefin (i) to graft silane (ii) to polyolefin (i); and,
   c) exposing the product resulting from step (b) to moisture to effect hydrolysis and condensation of polyolefin containing at least one [1,3,2]-dioxasilinane ring structure, thereby providing silane-crosslinked polyolefin, wherein the olefinically unsaturated[1,3,2]-dioxasilinane (ii), a free radical initiator (iii), an organic carboxylic acid (iv) and anti-oxidant (vi) are mixed to form a graftable silane composition prior to combining with the polyolefin in step (a).

10. The process of claim 9, wherein the graftable silane composition comprises from 70 to 99.79 weight percent of an olefinically unsaturated[1,3,2]-dioxasilinane (ii), from 0.1 to 10 weight percent of a free radical initiator (iii), from 0.1 to 10 weight percent of a percent organic carboxylic acid (iv) and from 0.01 to 10 weight percent of a percent anti-oxidant (vi), said weight percents based on the sum of the weights of olefinically unsaturated[1,3,2]-dioxasilinane (ii), free radical initiator (iii), organic carboxylic acid (iv) and anti-oxidant (vi).

11. The process of claim 10, wherein the organic carboxylic acid (iv) has the general Formula (III):

(III)

wherein G is a monovalent hydrocarbon group having from 6 to 18 carbon atoms and having the Formula (V):

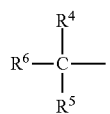
(V)

wherein each $R^4$, $R^5$ and $R^6$ is independently an alkyl group having from 1 to 15 carbon atoms with the proviso that the sum of carbon atoms in $R^4$, $R^5$ and $R^6$ groups is from 5 to 17 carbon atoms, a is 0 and b is 1.

12. The graftable silane composition of claim 9, wherein the free-radical initiator (iv) is selected from the group consisting of organic peroxides, organic peresters, azo compounds and combinations thereof and the anti-oxidant is selected from the group consisting of substituted phenols and substituted polyphenols, derivatives of phenylenediamine, ascorbic acid, tocopherols, tocotrienol, resveratrol, flavonoids, carotenoids, hydroxylamino compounds and combinations thereof.

13. The graftable silane composition of claim 9, wherein at least one olefinically unsaturated [1,3,2]-dioxasilinane (ii) selected from the group consisting of 2-methyl-3-(5-methyl-2-vinyl-[1,3,2]dioxasilinan-2-yloxy)-propan-1-ol; at least one free radical initiator (iii) selected from the group consisting of benzoyl peroxide, dichlorobenzoyl peroxide, dipropionyl peroxide, t-butyl peroxyisobutyrate or lauroyl peroxide dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 1,3-bis(t-butyl-peroxyisopropyl)benzene, t-butyl peracetate, t-butyl peroxy-2-ethyl hexanoate, t-butyl peroxy isobutyrate, t-butyl peroxy benzoate, 2,5-di(peroxybenzoate)hexyl-3, di-t-butyldiperoxy phthalate, 2,5-dimethyl-2,5-di(benzoyl peroxy)hexane, t-butylperoxy maleate, t-butylperoxy isopropyl carbonate; at least one organic carboxylic acid (iv) selected from the group consisting of lauric acid, capric acid, myristic acid, palmitic acid, oleic acid, stearic acid, behenic acid, arachidic acid, 12-hydroxystearic acid, ricinolic acid, montanic acid, oxalic acid, malonic acid, succinic acid, glutaric acid, adipic acid, pimelic acid, suberic acid, azelic acid, sebacic acid, phthalic acid, 2,2-dimethylhexanoic acid, 2-ethyl-2,5-dimethylhexanoic acid, 2,2-dimethyloctanoic acid, and 2-ethyl-2,11-dimethyldodecanoic acid; and at least anti-oxidant (v) selected from the group consisting of substituted phenols and substituted polyphenols.

14. The graftable silane composition of claim 13, wherein the at least one olefinically unsaturated [1,3,2]-dioxasilinane (ii) selected from the group consisting of 2-methyl-3-(5-methyl-2-vinyl-[1,3,2]dioxasilinan-2-yloxy)-propan-1-ol; at least one free radical initiator (iii) selected from the group consisting of benzoyl peroxide, dipropionyl peroxide, t-butyl peroxyisobutyrate, lauroyl peroxide dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 1,3-bis(t-butyl-peroxyisopropyl)benzene, t-butyl peracetate, t-butyl peroxy-2-ethyl hexanoate, t-butyl peroxy isobutyrate, t-butyl peroxy benzoate, 2,5-di(peroxybenzoate)hexyl-3, di-t-butyldiperoxy phthalate, 2,5-dimethyl-2,5-di(benzoyl peroxy)hexane, t-butylperoxy maleate and t-butylperoxy isopropyl carbonate: at least one organic carboxylic acid (iv) selected from the group consisting of 2,2-dimethylhexanoic acid, 2-ethyl-2,5-dimethylhexanoic acid, 2,2-dimethyloctanoic acid, and 2-ethyl-2,11-dimethyldodecanoic acid; and at least anti-oxidant (v) selected from the group consisting of substituted phenols and substituted polyphenols.

15. A silane crosslinked polyolefin made according to the process of claim 9.

16. The silane crosslinked polyolefin of claim 15, wherein the at least one olefinically unsaturated [1,3,2]-dioxasilinane (ii) is selected from the group consisting of 2-methyl-3-(5-methyl-2-vinyl-[1,3,2]dioxasilinan-2-yloxy)-propan-1-ol and 2,5-dimethyl-2-vinyl-[1,3,2]dioxasilinane; at least one free radical initiator (iii) selected from the group consisting of benzoyl peroxide, dipropionyl peroxide, t-butyl peroxyisobutyrate, lauroyl peroxide dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 1,3-bis(t-butyl-peroxyisopropyl)benzene, t-butyl peracetate, t-butyl peroxy-2-ethyl hexanoate, t-butyl peroxy isobutyrate, t-butyl peroxy benzoate, 2,5-di(peroxybenzoate)hexyl-3, di-t-butyldiperoxy phthalate, 2,5-dimethyl-2,5-di(benzoyl peroxy)hexane, t-butylperoxy maleate and t-butylperoxy isopropyl carbonate; at least one organic carboxylic acid (iv) selected from the group consisting of 2,2-dimethylhexanoic acid, 2-ethyl-2,5-dimethylhexanoic acid, 2,2-dimethyloctanoic acid, and 2-ethyl-2,11-dimethyldodecanoic acid; and at least antioxidant (v) selected from the group consisting of substituted phenols and substituted polyphenols.

17. A silane-crosslinked polyolefin made according to the process of claim 1.

* * * * *